United States Patent
Otiko et al.

(10) Patent No.: US 12,465,567 B2
(45) Date of Patent: Nov. 11, 2025

(54) ENHANCED ANTIBIOTIC AND DRUG DELIVERY FOR AQUEOUS TOPICAL APPLICATIONS FOR HUMAN AND VETERINARY USES

(71) Applicant: Christopher Ayo Otiko, Tarzana, CA (US)

(72) Inventors: Christopher Ayo Otiko, Tarzana, CA (US); David R. Pozek, Dearborn, MI (US)

(73) Assignee: Christopher Ayo Otiko, Tarzana, CA (US)

( * ) Notice: Subject to any disclaimer, the term of this patent is extended or adjusted under 35 U.S.C. 154(b) by 0 days.

(21) Appl. No.: 16/522,259

(22) Filed: Jul. 25, 2019

(65) Prior Publication Data

US 2020/0146983 A1 May 14, 2020

Related U.S. Application Data

(60) Provisional application No. 62/757,891, filed on Nov. 9, 2018.

(51) Int. Cl.
| | |
|---|---|
| *A61K 9/06* | (2006.01) |
| *A61K 31/35* | (2006.01) |
| *A61K 31/39* | (2006.01) |
| *A61K 31/59* | (2006.01) |
| *A61K 31/65* | (2006.01) |

(52) U.S. Cl.
CPC ............ *A61K 9/06* (2013.01); *A61K 31/59* (2013.01); *A61K 31/65* (2013.01)

(58) Field of Classification Search
CPC ...................................................... A61K 9/06
See application file for complete search history.

(56) References Cited

U.S. PATENT DOCUMENTS

| | | | |
|---|---|---|---|
| 8,343,945 B2 | 1/2013 | Tamarkin et al. | |
| 2008/0188446 A1* | 8/2008 | Muldoon | A61K 31/65 |
| | | | 514/154 |
| 2013/0190274 A1 | 7/2013 | Phillips et al. | |

OTHER PUBLICATIONS

Athira et al. Ufasome: A Potential Phospolipid Carrier as a Novel Pharmacuetical Formulation. Mar. 2014.*
Hao et al. (Heat Effects on Drug Delivery Across Human Skin). (Year: 2016).*
Cacao et al. Solubility of Antibiotics in Different Solvents. Part II. Non-Hydrochloric acid Forms of Tetracycline and Ciprofloxacin. (Year: 2008).*

* cited by examiner

*Primary Examiner* — Sarah Alawadi
(74) *Attorney, Agent, or Firm* — Fox Rothschild LLP

(57) ABSTRACT

A method for delivery of an active antibiotic agent to a localized, infected site involves steps of creating an ointment by combining an active antibiotic agent with a tissue penetrating solvent suitable for solubilizing a non-liquid active pharmaceutical ingredient, a tissue penetrating diluent, and a stabilizer for maintaining the ointment, which also functions to as a stabilizer for maintaining chemical stability and resistance to degradation, adjusting viscosity of the ointment by adjustment of amount of the solvent, determining location and extent of the infected site, and applying a predetermined volume of the ointment over skin at the infected region.

3 Claims, 15 Drawing Sheets

In-vitro release profile of the tetracycline solution and formulation. Values are mean ± SD (n=3)

MTT viability assay of reconstructed human skin after treatment with different formulations. Values are mean ± SD (n=3)

Percent of applied dose of tetracycline in stratum corneum (SC), epidermis/dermis and receptor compartment after 6 hrs of treatment of porcine skin (PS) and human skin (HS).

Percent of applied dose of tetracycline in receptor compartment after 48 hrs of treatment of porcine skin (PS) and human skin (HS).

Percent of applied dose of tetracycline in skin and in receptor compartment after 48hrs of treatment of porcine skin (PS) and human skin (HS).

Percent of applied dose of tetracycline in receptor compartment till 48hrs after treatment of porcine skin for 6hrs followed by removal of the drug Percent of applied dose of tetracycline in skin and receptor compartment at 48hrs after treatment of porcine skin for 6hrs followed by removal of the drug.

Percent of applied dose of tetracycline in skin and in blood after 6hrs of treatment in vivo in mice.

TEWL as a function of SC removal after 100% removal of SC.

TEWL as a function of SC removal after 50% removal of SC.

In vitro skin penetration of tetracycline in intact and tape-stripped porcine skin.

TEWL as a function of SC removal after 100% removal of SC in vivo in mice.

: In vivo skin penetration of tetracycline in intact and tape-stripped mouse skin.

ENHANCED ANTIBIOTIC AND DRUG DELIVERY FOR AQUEOUS TOPICAL APPLICATIONS FOR HUMAN AND VETERINARY USES

BACKGROUND OF THE INVENTION

1. Field of the Invention

The present invention is in the technical field of delivery of antibiotics and other pharmaceuticals through topical application.

2. Description of Related Art

Over the last half-century prior to the filing of this application, infection challenges to modern medicine have been dealt with by creation of new pharmaceutical compounds and new delivery modalities. Advances in drug delivery know-how have greatly aided the new compound discoveries; however, for overall health in many societies, new challenges have emerged. New diseases or old diseases that have developed resistance mechanisms have proved difficult to treat, with antibiotic resistance identified as a major health issue focus of the World Health Organization. The cost of new pharmaceuticals and delivery to subjects is also high, both in financial and R&D time resources. The need for safe treatments is particularly acute within the infectious disease area; especially given the increase in senior demographics and issues associated with infections acquired from new pathogen exposure while in health care centers and institutions. In many instances, chronic or recalcitrant infections are not being adequately treated, leading to co-morbidities and death.

Currently there are intravenous, oral and topical antibiotic products on the market. These products have wide ranges in effectiveness, can be quite costly and generally require multiple doses per day per person which can lead to other health issues: gastric, intestinal microbiome disruption, and so on.

Clearly what is needed is an approach utilizing a simple active therapeutic and easily applied formulation that achieves a high rate of efficacy against the most prolific infections of the day based on existing, safe compounds that are cost effective and very efficacious, to be administered by topical application and at concentrations that offset some of the issues of pathogen resistance build-up.

BRIEF SUMMARY OF THE INVENTION

The present invention is a cost effective, simple to apply, medical grade active pharmaceutical ingredient delivery formulation developed to deliver active agents to specific tissue sites. Each active agent delivery formulation is designed for topical application and uses a novel, multi-phase approach for transport and other functions. This solution is a focused topical approach unlike oral or intravenous applications, such that larger concentrations of a mature but effective antibiotic can overwhelm a difficult to treat infection while mitigating the effects of other application techniques which can result in issues such as gastric, and intestinal microbiome disruptions. This topical formulation with its tissue penetration capabilities also aids in the healing of difficult to treat infections and the high antibiotic concentration is not amenable to a pathogen's ability to develop a tolerance to the antibiotic agent.

A surgical medicament is provided for use as a penetrating medicated lavage in a deep tissue wound suitable for delivering at least one active pharmaceutical ingredient to desired locations of host tissue for primary therapeutic effect against bacterial pathogens at the desired locations and adjacent surgically inaccessible locations, and also for delivering at least one secondary therapeutic effect by weakening the pathogen survival against the at least one active pharmaceutical ingredient thereby enhancing the primary effect of the active pharmaceutical ingredient and by improving healthy tissue natural response mechanisms in tissue adjacent to the pathogens. A pharmaceutical drug delivery formulation, tissue penetrating solution, comprises an efficacious antibiotic; a suitable solvent; a diluent to optimize the solution for tissue compatibility with the diluent also comprising a second diffusion constant suitable for carrying said active pharmaceutical ingredient—a multiple component formulation to enhance the tissue diffusion and dispersion and stabilizers and anti-oxidants for maintaining chemical stability/mitigating oxidation during storage for an extended shelf life; vitamins to help enhance healing in human and veterinary subjects on a formulation that is effective against a wide variety of gram positive and gram negative pathogens.

DETAILED DESCRIPTION OF THE INVENTION

Figure 1:
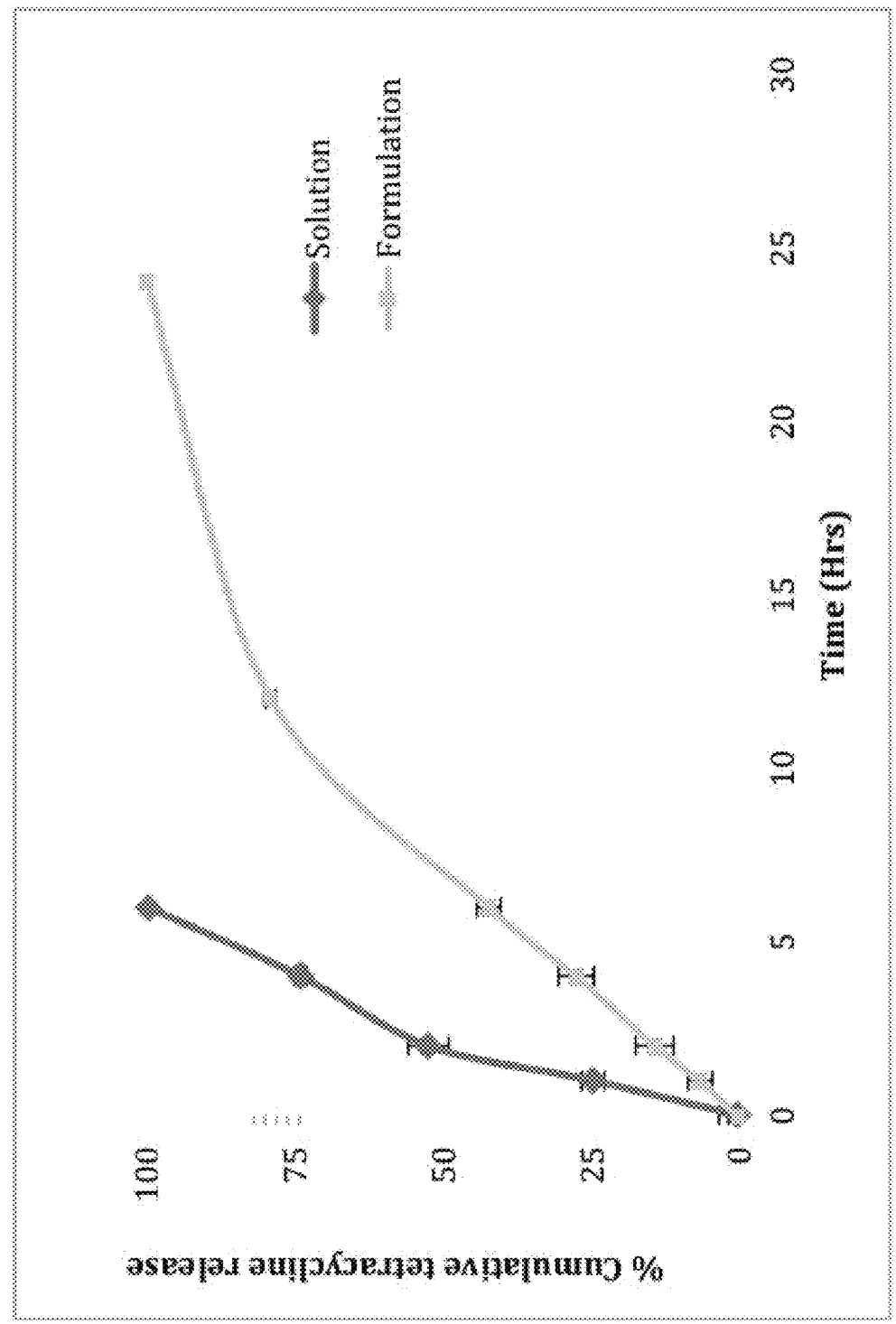
FIG. 1 shows in-vitro release profile of tetracycline solution and formulation.

In view of the wide variety and evolution of active pharmaceutical agents, and concomitant wide variety in their modes of action against different pathogens, it is not obvious to revert to the use of unaltered, older, well-established antibiotics/drugs; however, despite contrary teachings and trends in the art, the technologies of this invention enable use of older, unaltered, active pharmaceutical ingredients in a powerful new way. Suitable active agents may be selected or screened from the group consisting of antimicrobials, antifungals, antivirals, anesthetics, analgesics, corticosteroids, nonsteroidal anti-inflammatories, retinoids, lubricating agents, anti-warts, anti-proliferative, vasoactive, keratolytic, dicarboxylic acids and esters; calcium channel blockers, cholinergic, N-oxide donors, photodynamic, anti-acne, anti-wrinkle, anti-oxidants, selftanning active herbal extracts, acaricides, age spot and keratose removing agents, allergens, anti-aging agents, antibiotics, anti-burn agents, anti-cancer agents, antidandruff agents, anti-depressants, anti-dermatitis agents, anti-endemics, antihistamines, anti-helminths, anti-hyperkeratolyte agents, anti-inflammatory agents, anti-irritants, antilipemics, antimycotics, anti-proliferative agents, anti-anti-pruritics, antipsoriatic agents, anti-rosacea agents, anti-seborrheic agents, antiseptics, anti-swelling agents, anti-yeast agents, astringents, topical cardiovascular agents, chemotherapeutic agents, dicarboxylic acids, disinfectants, fungicides, hair growth regulators, hormones, hydroxy acids, immuno-suppressants, immuno-regulating agents, keratolytic agents, lactams, metals, metal oxides, mitocides, neuropeptides, oxidizing agents, pediculicides, photodynamic therapy agents, retinoids, sanatives, scabicides, self-tanning agents, skin whitening agents, vasoconstrictors, vasodilators, vitamins, vitamin D derivatives, wound healing agents and wart removers. The active agent may also be selected from the group consisting of acyclovir, azelaic acid, benzoyl peroxide, betamethasone, caffeine, calcipotriol, calcipotriol hydrate, calcitriol, cyclopiroxolamine, diclofenac sodium, ketoconazole, miconazole nitrate, minoxidil, mupirocin, nifedipine regular, permethrin bpc (cis:trans 25:75), piroxicam, salicylic acid and terbinafine HCl, tetracycline and tetracycline HCl, doxycycline, or minocycline and its family of drugs.

Alternatively to the above description, the active agent may be selected from the group consisting of a beta-lactam antibiotic, an aminoglycoside, an anthraquinone, an azole, an antibiotic glycopeptide, a macrolide, an antibiotic nucleoside, an antibiotic peptide, an antibiotic polyene, an antibiotic polyether, an antibiotic quinolone, an antibiotic steroid, a sulfonamide, an antibiotic metal, an oxidizing agent, a periodate, a hypochlorite, a permanganate, a substance that releases free radicals and/or active oxygen, colloidal oatmeal, a cationic antimicrobial agent, a quaternary ammonium compound, a biguanide, a triguanide, a bisbiguanide, a polymeric biguanide, and analogs, derivatives, salts, ions, and complexes thereof, natural anti-microbial and antifungal ingredients, including, for example, thyme and other herbs and natural substances can be included in related embodiments. Even further embodiments comprise the at least one active pharmaceutical ingredient being in a concentration of less than or equal to 50 percent, the specific concentration dictated by the application and active agent's efficacy. In the midst of current efforts to create new super-pharmaceuticals to deal with newly evolving super-pathogens, a new approach is possible.

Remarkably, using the teachings of this invention, the original early generation antibiotics, such as in the tetracycline family, may now have newly identified efficacies. Indeed, when deployed using the improved delivery formulations as described herein, tetracycline is again potent against organisms which have established resistance to the drug in other delivery modalities. The widespread tolerance to tetracycline-class of products provides an ideal potential to create a new use and a new dosing formulation for this excellent, mature active agents: the tetracycline class of protein synthesis inhibitors, some of which include: chlortetracycline, oxytetracycline, minocycline, doxycycline, methacycline, lymecycline and their HCl salts and a more recent addition to the class, a glycylcycline known commercially under the name of Tigecycline. Other derivative drugs to consider are the naturally occurring or semi-synthetic polyketide compounds that exhibit a well-known broad-spectrum antibacterial activity that interferes with prokaryotic protein synthesis at the ribosome level.

In addition to this well-known antibacterial activity, these compounds also exhibit a variety of additional, less well-known properties, such as separate and distinct anti-inflammatory properties. Tetracycline and related compounds have been shown to be effective chemotherapeutic agents in a wide variety of chronic inflammatory diseases and conditions. In addition to being well-tolerated and as an excellent first aid antibiotic worldwide for many years; tetracycline and related compounds has also demonstrated efficacy against periodontitis, rosacea, acne, auto-immune diseases such as rheumatoid arthritis and protection of the central nervous system against trauma and neurodegenerative diseases such as stroke, multiple sclerosis and Parkinson's disease. Tetracycline and related compounds appear to be beneficial for treatment of several chronic inflammatory airway diseases: i.e.; asthma, bronchiectasis, acute respiratory distress syndrome, chemical induced lung damage, cystic fibrosis and chronic airway inflammation. Traditionally, tetracycline-class of products, dosing has been limited to a tablet or capsule form (both solids) in-part due to oxidation susceptibility when in a liquid or ointment. This invention includes new anti-oxidation, stabilization, and homogeneous dispersion techniques for use with liquid and ointment forms of tetracycline and related compounds, as well as other agents that mitigate degradation to improve solution consistency.

In embodiments of the invention, a formulation is provided by which the active agent may be placed into an optimum viscosity ointment solution which has excellent stability and shelf life. The term "optimum viscosity" is intended to mean an ointment that is configured for rapid penetration into tissue to achieve maximum simultaneous primary and secondary therapeutic effects, including barrier and emollient functions at a micro-scale, into all sizes of tissue/wound sites and tissue/cellular interstices. Other formulations can alter the agent's properties to be more viscous and/or semi-solid forms, i.e. a thicker-barrier style ointment form. This enables additional treatment options; an economical therapy regime with higher levels of efficacy and lower risk profiles than other wound treatment alternatives.

In addition, some embodiments of the invention provide an active agent formulation by which a stable and highly efficacious active agent delivery is achieved. This high efficacy is against persistent pathogens, which are often not susceptible to effective eradication by other techniques. This new result occurs due to the discovery of a sequence of formulation steps and constituent ingredients related to the formulation development. In particular, these steps include providing a selected concentration of the agent suitable for combining the active agent with a select solvent while combining a diluent or buffer to optimize the solution for tissue compatibility in the presence of a dispersant and combining stabilizers to minimize damage from oxidation effects to ensure precise and controlled dispersion which helps promote more effective healing.

Also, a tissue-penetrating active antibiotic drug delivery solution is provided, comprising: an antibiotic medication for human and veterinary use with up to 50% concentration tetracycline, its HCl salts and related compounds as the active pharmaceutical ingredient; a tissue penetrating solvent suitable for solubilizing a non-liquid active pharmaceutical ingredient, the solvent comprising dimethyl sulfoxide in a concentration range of up to 20%; a tissue penetrating diluent to optimize the solution for tissue compatibility with the diluent being dipropylene glycol in a concentration of up to 95%; a stabilizer for maintaining the dispersant which also functions to as a stabilizer for maintaining the chemical stability and substantially free from degradation; the dispersant in the therapeutic concentration being in an amount up to 10%, by weight of the drug delivery solution, with the stabilizer in the concentration range of up to 10%; with the addition of Vitamin D source, including cholecalciferol, 7-dehydrocholesterol, 25-hydroxycholecalciferol, and 1,25-dihydroxycholecalciferol or an equivalent substance or related analogues, in a medically efficacious amount.

The first carrier is suitable for solubilizing and carrying the active pharmaceutical ingredient through tissue, comprising a first diffusion constant suitable for carrying an efficacious concentration to a tissue depth deeper than the stratum corneum within the tissue site; and, a second carrier suitable for both diluting the solvent and optimizing the solution and having a second diffusion constant different than the first diffusion constant and suitable for carrying an efficacious concentration of said active pharmaceutical ingredient to a tissue depth shallower than the stratum corneum within the tissue site. To achieve primary therapeutic effect against the pathogens, the first chemical penetration enhancer further having characteristics suitable for carrying the active pharmaceutical ingredient through the cell walls of gram-positive and gram-negative bacterial pathogens to deliver a portion of active antibiotic pharmaceutical ingredient to an interior portion of the pathogen thereby enhancing the primary therapeutic effect of an active pharmaceutical ingredient against the pathogens.

The second chemical penetration enhancer has diluent properties for diluting the first chemical penetration enhancer and an active pharmaceutical in solution to optimize the solution for tissue compatibility and has further characteristics for providing a zone of enhanced inhibition to provide protection from any pathogenic effect between the adjacent healthy tissues and the pathogens. The second chemical penetration enhancer and the first chemical penetration enhancer are, in one embodiment, in a ratio by weight percent which can be up to 10:1. The dispersant also functions as a stabilizer for maintaining the solution chemical stability and substantially free from degradation; the dispersant in the therapeutic composition being in an amount up to 10%, by weight of the drug delivery solution.

In one embodiment a non-hygroscopic first chemical penetration enhancer has solvent properties suitable for solubilizing an active pharmaceutical ingredient; the first chemical penetration enhancer having a weight percent range in the delivery formulation up to 20%; a hygroscopic second chemical penetration enhancer having diluent properties for diluting the first chemical penetration enhancer and an active pharmaceutical with the second chemical penetration enhancer having a weight percent range in the delivery formulation of up to 98%; an anti-oxidizing dispersant mixable in solution with the first and second chemical penetration enhancers and an active pharmaceutical ingredient, said dispersant being in a weight percent of the solution up to 10% and being suitable for providing multiple secondary therapeutic effects by interaction with the active pharmaceutical ingredient to ensure substantial homogenous distribution of the selected active pharmaceutical ingredient in the solution during delivery of the solution to all areas of the tissue location and by further reducing the water activity level of the solution. The first chemical penetration enhancer has a normal diffusion constant greater than about 1.5.times.10.sup.-5 cm.sup.2/sec and has a specific gravity greater than 1.0 so that it acts to alter the hydration sheath structure of proteins in the cell wall of the pathogen.

An anti-oxidant dispersant is provided suitable for providing secondary therapeutic effect by interaction with the active pharmaceutical ingredient to ensure substantial homogenous distribution of the selected active pharmaceutical ingredient in the solution during delivery of the solution to all areas of the tissue location. The dispersant also functions as a stabilizer for maintaining the solution chemically stable and substantially free from degradation; the dispersant in the therapeutic composition is in an amount 7 up to 10%, by weight of the drug delivery solution in one embodiment, and the solution is suitably hygroscopic to reduce the water activity level in any pathogen at a primary tissue site and at tissue adjacent to the primary tissue site.

The anti-oxidant and stabilization techniques used in various embodiments demonstrate the multi-functionality of the essential constituent ingredients in the embodiments of the invention. In some embodiments the levels of antioxidant agents may result in secondary benefits relating to promoting tissue repair and regeneration at the interface of a pathogen and proximal healthy tissue, as well as contributing to one of the various modes of action of pathogen inhibition, wherein the hygroscopic chemical penetration enhancer and the non-hygroscopic chemical penetration enhancer are in a ratio by weight percent of up to 10:1; with the second non-hygroscopic chemical penetration enhancer having a specific gravity greater than 1.05 so that it alters the hydration sheath structure of proteins in the cell wall of a bacterial pathogen.

Concentration ranges of dimethyl sulfoxide depending on application may vary from 5% to 90%. Various ratios of solvent to diluent are provided for the formulation depending on the application; the ratio of solvent to diluent wide ranging from 1:1, 1:5, 3:5, 4:5 and, when a gel or other thickening agents are used, the ratio may be 5:1 to 20:1. The drug delivery formulation's stabilizer is selected from the list of stabilizers comprising ascorbic acid, sorbic acid, Vitamin D and numerous other medically acceptable substitutes. Dispersants might also include some of the above such as ascorbic acid, sorbic acid but also may include a thiol, lipoic acid, a polyphenol, glutathione, tocopherol (vitamin E), a tocotrienal, uric acid, a peroxidase, coenzyme Q, carotene, and melatonin in a concentration range up to 2%. In certain medical applications it is desirable to configure the drug delivery solution as an ointment or similar semi-solid physical form. In such instances, the drug delivery solution further comprises a semi-solid gel carrier formulated for solution mixing with the active ingredient, the solvent, the diluent, and the stabilizer; and with the gel carrier comprising oil-based gel.

Alternatively, the drug delivery solution in some embodiments may comprise a semi-solid gel carrier formulated for solution mixing with the active ingredient, the solvent, the diluent, and the stabilizer; with the gel carrier comprising water-based gel. In this embodiment, the semi-solid gel carrier may comprise water, glycerin, hydroxyethyl cellulose, chlorhexidine digluconate, glucolactone, methylparaben, and sodium hydroxide in suitable proportions to form a semi-solid ointment with the active ingredient, the solvent, the diluent, and the stabilizer.

In some embodiments, additional tissue regeneration and repair and healing ingredients may be added, comprising levels of ascorbic acid up to about 10 percent and medically efficacious amounts of Vitamin D, sources include cholecalciferol, 7-dehydrocholesterol, 25-hydroxycholecalciferol, and 1,25-dihydroxycholecalciferol or an equivalent substance including variants related to Vitamin D3. Additional possible ingredients may further comprise at least one homeopathic non-USP pharmaceutical-regulated ingredient to promote a therapeutic effect of tissue healing selected from the list of ingredients including *Calcarea sulfurica*, silica, D-glucuronicacid, Vitamin A, Vitamin E, Vitamin C, bioflavonoids, garlic, garlic extract, coconut oil, tea-tree oil, oregano, colloidal silver, *Arnica montana*, aspirin, thymol, a mixture of cavacrol and thymol, oil of thyme, oil of lavender, *Echinacea*, marigold, myrrh, *Symphytum officinale* L., aloe vera, bromelain, and goldenseal in therapeutically efficacious amounts.

In some embodiments one or more sunscreen or sunblock agents are added to the formulation of the invention. A key factor enabling this embodiment is the compatibility of these agents with dipropylene glycol and with dimethyl sulfoxide. The following sunscreen or sunblock agents are conducive to use with this formulation, as desired, although additional such agents are contemplated within the scope of this invention: Amino benzoic acid (PABA), Avobenzone, Cinoxate, Dioxybenzone, Homosalate, Menthyl anthranilate, Octocrylene, Octyl methoxycinnamate, Octyl salicylate, Oxybenzone. Padimate, Phenylbenzimidazole sulfonic acid, Sulisobenzone, Titanium dioxide, Trolamine salicylate, and Zinc oxide. The preferred dosage of each of the above agents is: Amino benzoic acid (PABA) up to 15 percent, Avobenzone up to 3 percent, Cinoxate up to 3 percent, Dioxybenzone up to 3 percent, Homosalate up to 15 percent, Menthyl anthranilate up to 5 percent, Octocrylene, Octyl methoxycinnamate, Octyl salicylate up to 5 percent, Oxybenzone up to 6 percent, Padimate up to 8 percent, Phenylbenzimidazole sulfonic acid up to 4 percent, Sulisobenzone up to 10 percent, Titanium dioxide up to 25 percent, Trolamine salicylate up to 12 percent, Zinc oxide up to 25 percent.

A substantial number of ingredients in formulations in different embodiments of the present invention are detailed above. In further research and testing, however, several other ingredients have been found to be effective in various formulations, as follows:

A. Sorbic acid is used in some embodiments as an antimicrobial agent often used as a preservativet to prevent growth of mold, yeast, and fungi.
B. Magnesium stearate is used in some embodiments as a simple salt made of two common nutritional substances, the mineral magnesium and the saturated fat stearic acid. It is used as a "flow agent" in several embodiments.
C. Histidine is an amino acid used in embodiments as a building block for protein. It aids human cells to regenerate skin caused by the damage from infection, trauma and so on.
D. Glycerin is a humectant naturally derived from plant oils, or it can also be synthetically produced. In embodiments of the invention it is used as a humectant, working to moisturize human skin by drawing water from the air into the skin's outer layer.
E. Hydroxyethylcellulose is a non-ionic, water-soluble polymer, used in embodiments as a thickening agent for aqueous cosmetic and personal care formulations.
F. Chlorhexidine gluconate is used in various formulations as a germacidal agent.
G. Acetic acid reduces inflammation caused by infection, trauma etc.

Case Studies

A number of case studies are known to the inventor, that are not, as of the priority date of this patent application, public information. Some details of seven such studies are presented below, numbered 1 through 7:

1—A Measure of Efficacy of 3% Tetracycline Hydrochloride Ointment First Aid Antibiotic In one embodiment of the invention a formulation is provided as a First Aid Antibiotic the inventors termed 3% Tetracycline Hydrochloride Ointment. Tables below illustrate efficacy of this formulation against several common bacteria. The six bacteria used in this study were *E. coli, Pseudomonas aeruginosa*, Coagulase negative *Staphylococcus aureus* (CNSA), Methacillin resistant *Staphylococcus aureus* (MRSA), Methacillin Susceptible *Staphylococcus aureus* (MSSA), and Mupirocin resistant *Staphylococcus aureus* (MuRSA). Report results presented below are a combined average of three trials: two independent and one blind. Each trial followed the same protocol and used the same product. The bacteria were grown in pure culture and each was suspended in phosphate buffered saline (PBS). It was found that the preparation of the First Aid Antibiotic formulation killed more than 99.0% of *E. coli, P. aeruginosa*, CNSA, MRSA, MSSA, and MuRSA. The First Aid Antibiotic killed greater than 99% of common resistant bacteria.

The First Aid antibiotic ointment in this embodiment comprises 3% Tetracycline Hydrochloride delivered by Dual Carrier Technology (DCT). DCT is a tissue penetration technology that creates releasable binds to the active pharmaceutical ingredient, as the carrier transports the drug in a high penetration format through the pathogen cell wall to effectively kill the bacteria and reduce the water activity level (e.g. dehydrate) in the bacteria, for both a pharmaceutical and mechanical kill.

In the method, six bacteria were grown in pure culture and each was suspended in phosphate-buffered saline (PBS). The bacterial suspension was mixed with 30 ul or 30 ug of each of the antimicrobial products. Three replicates were completed for each bacteria/antimicrobial product combination at separate time points. A control containing each bacterium without an antimicrobial product was completed per bacterium per replication. The mixtures were incubated for 4 hours at 37° C. and plated onto blood agar plates. The plates were incubated for 24 hours at 37° C. The colony forming units per milliliter (CFUs/ml) were counted and compared to the control.

Partial Table I

| | | | | | | | | | | |
|---|---|---|---|---|---|---|---|---|---|---|
| Vitastem ® Blind Study | 10 | 0.4 | 99.6 | 10 | 1.0 | 99.0 | 10 | 0.4 | 99.6 | 99.4 |
| Control | 2300 | 100 | 0 | 1030 | 100 | 0 | 2465 | 100 | 0 | 0 |
| Coagulase Negative Staph. Aureus | | | | | | | | | | |
| Vitastem ® 1 | <100 | <.71 | >99.29 | <100 | <.56 | >99.44 | <100 | <1.14 | >98.86 | >99.2 |
| Control | 14000 | 100 | 0 | 18000 | 100 | 0 | 8800 | 100 | 0 | 0 |
| Vitastem ® 2 | 10 | 1.12 | 98.88 | 10 | 0.67 | 99.33 | 10 | 1.11 | 98.89 | >99.03 |
| Control | 890 | 100.00 | 0.00 | 1500 | 100.00 | 0.00 | 900 | 100.00 | 0.00 | 0 |
| Vitastem ® Blind Study | 10 | 6.7 | 93.3 | 10 | 3.0 | 97.0 | 10 | 1.6 | 98.4 | 96.2 |
| Control | 150 | 100 | 0 | 330 | 100 | 0 | 610 | 100 | 0 | 0 |
| Methicillin Susceptible Staph. Aureus | | | | | | | | | | |
| Vitastem ® 1 | <100 | <.22 | >99.78 | <100 | <.29 | >99.71 | <100 | <.23 | >99.77 | >99.75 |
| Control | 45000 | 100 | 0 | 35000 | 100 | 0 | 43000 | 100 | 0 | 0 |
| Vitastem ® 2 | 10 | 0.42 | 99.58 | 10 | 0.49 | 99.51 | 10 | 0.32 | 99.68 | >99.59 |
| Control | 2360 | 100.00 | 0.00 | 2040 | 100.00 | 0.00 | 3100 | 100.00 | 0.00 | 0 |
| Vitastem ® Blind Study | 10 | 1.1 | 98.9 | 10 | 0.3 | 99.7 | 10 | 0.6 | 99.4 | 99.3 |
| Control | 930 | 100 | 0 | 2865 | 100 | 0 | 1680 | 100 | 0 | 0 |
| Mupirocin Resistant Staph. Aureus | | | | | | | | | | |
| Vitastem ® 1 | <100 | <.36 | >99.64 | <100 | <.40 | >99.60 | <100 | <.36 | >99.64 | >99.63 |
| Control | 28000 | 100 | 0 | 25000 | 100 | 0 | 28000 | 100 | 0 | 0 |
| Vitastem ® 2 | 10 | 0.32 | 99.68 | 10 | 0.22 | 99.78 | 10 | 0.51 | 99.49 | >99.65 |
| Control | 3100 | 100.00 | 0.00 | 4600 | 100.00 | 0.00 | 1960 | 100.00 | 0.00 | 0 |
| Vitastem ® Blind Study | 10 | 1.0 | 99.0 | 10 | 0.3 | 99.7 | 10 | 0.4 | 99.6 | 99.4 |
| Control | | 100 | 0 | | 100 | 0 | | 100 | 0 | 0 |

Summary of results from Efficacy Evaluation

| Vitastem ® | Exp. 1 Averages | Exp. 2 Averages | Exp. 3 Averages (Blinded) | All Averages |
|---|---|---|---|---|
| E. coli | >99.14 | >99.50 | >98.90 | >99.18 |
| P. aeruginosa | >99.72 | >99.40 | >99.70 | >99.61 |
| Methicillin Resistant Staph. aureus | >99.75 | >99.80 | >99.40 | >99.65 |
| Coagulase Negative Staph. aureus | >99.2 | >99.03 | >96.22 | >98.15 |
| Methicillin Susceptible Staph. aureus | >99.75 | >99.59 | >99.33 | >99.55 |
| Mupirocin Resistant Staph. aureus | >99.63 | >99.65 | >99.43 | >99.57 |

SUMMARY

*E. coli*: The First Aid Antibiotic preparation killed on an average 99.18% of *E. coli*.

*Pseudomonas aeruginosa*: The First Aid Antibiotic preparation killed on an average 99.61% *P. Aeruginosa*.

Methicillin resistant *Staphylococcus aureus* (MRSA): The First Aid Antibiotic preparation killed on an average 99.65% MRSA.

Coagulase negative staph *aureus* (CNSA): The First Aid Antibiotic preparation killed on average 98.15% CNSA.

Methicillin susceptible *Staphylococcus aureus* (MSSA): The First Aid Antibiotic preparation killed on average 99.55% MSSA.

Mupirocin resistant *Staphylococcus aureus* (MuRSA): The First Aid Antibiotic preparation killed on average 99.57% MuRSA.

2—Preclinical Studies of 3% Tetracycline Hydrochloride Ointment; a Proprietary 3% Tetracycline Hydrochloride Formulation Tetracycline is a broad-spectrum antibiotic, active against gram-positive and gram-negative bacteria, as well as organisms such as *mycoplasma* and *chlamydia*. The main goal of the project was to study the safety and skin penetration of a proprietary topical tetracycline formulation developed by Inventus, LLC. Overall the formulation sustained the release of tetracycline compared to the solution formulation. The formulation also took up moisture up to 42% when exposed to 65% RH. In-vitro skin irritation studies were carried out using reconstructed human skin tissue. In-vivo irritation studies and topical bioavailability studies were conducted using SKH-1 hairless mice.

The skin penetration studies of the control tetracycline solution and topical tetracycline formulation were carried out in excised porcine and human skin. To mimic the skin penetration of tetracycline in different skin wound and injury, the permeation studies were carried out after partial (50%) and complete removal of the stratum corneum (100%) by tape stripping. The results from the study demonstrate that the tetracycline formulation produced mild skin irritation comparable to baby shampoo. The in-vitro skin penetration studies showed comparable skin penetration trend in porcine and human skin.

Around 0.5-1% of the applied dose was found in the skin after 6 hrs of application which increased to 3% with 48 hrs treatment. In vivo mice studies showed that tetracycline was mainly retained in the skin with no measurable systemic absorption after 6 hrs of treatment. However the skin damage was found to significantly increase the skin penetration of tetracycline both in-vitro and in-vivo. Overall the results from the study show that the tetracycline formulation is generally safe and can achieve therapeutic concentrations in the skin. Changes in skin barrier as in case of wound and skin injuries, can result in higher drug absorption.

A purpose of this study was to determine general safety and penetration abilities of the proprietary over the counter (OTC) First Aid antibiotic ointment with 3% Tetracycline delivered by Dual Carrier Technology (DCT). The DCT is a tissue penetration technology, which forms a releasable bond to the active pharmaceutical ingredient, as the carrier transports the drug in a high penetration format through the pathogen cell wall to effectively kill the bacteria and reduce the water activity level (e.g. dehydrate) in the bacteria for a pharmaceutical and mechanical kill.

Materials used were Tetracycline Hydrochloride (Sigma Aldrich, USA), 3H Tetracycline Hydrochloride (Moravek Biochemicals and Radiochemicals, United States), Tetracycline topical ointment (3% w/v) (pharmaCline, United States), Dialysis Membrane (Spectrum Labs, United States), Sodium Hydroxide, Ethanol, Sodium Bromide, Sodium Chloride, Potassium Chloride, Sodium Phosphate Dibasic Anhydrous (Fisher Scientific, United States), Potassium Phosphate Monobasic (Sigma Aldrich, USA), Scintillation Cocktail (Ecoscint H; National Diagnostics, United States), Scotch Tape (3M, Scotch and the Plaid Design, United States), EPI-200 (Mattek Corporation, United States). SKH-1 Mice (Charles River Laboratories, United States), Porcine Skin (Procured from the Slaughter house in the Department of Animal and Range Sciences, SDSU), Human Skin (Purchased from NDRI, Philadelhpia, PA).

Study #1

To test the release of tetracycline from the formulation, in-vitro release studies were carried out using dialysis membrane (Cellulose ester membrane, MWCO: 3.5-5 kDa) in phosphate buffered saline (pH 7.4). About 100 µl of the tetracycline solution and formulation (equivalent to 3 mg of tetracycline) was placed in the dialysis cassette. At predetermined time intervals (1-24 hrs) 1 ml of the samples was withdrawn from the receptor compartment and was replaced with 1 ml of fresh medium. Tetracycline content was analyzed by UV visible spectrophotometery at 355 nm.

Results of Study #1:
To test the release of tetracycline from the formulation, in-vitro release studies were carried out using dialysis membrane (Cellulose ester membrane, MWCO: 3.5-5 kDa) in phosphate buffered saline (pH 7.4). About 100 µl of the tetracycline solution and formulation (equivalent to 3 mg of tetracycline) was placed in the dialysis cassette. At predetermined time intervals (1-24 hrs) 1 ml of the samples was withdrawn from the receptor compartment and was replaced with 1 ml of fresh medium. Tetracycline content was analyzed by UV visible spectrophotometery at 355 nm. Some results are shown in FIG. 1.

To test hygroscopicity of the formulation, the tetracycline formulation was exposed to various humidity conditions. Saturated solutions of sodium bromide (RH: 65%), and keep it in a desiccator at room temperature and allowed for 2 hrs to attain the desired humidity. After 2 hrs, accurately weighed amount of tetracycline formulation (about 0.5 g in triplicate) was placed in a watch glass and kept in the desiccator. At predetermined time intervals (1-48 hrs) samples were removed and weighed. The increase in weight of tetracycline formulation was used to calculate the % moisture uptake.

Figure 2:
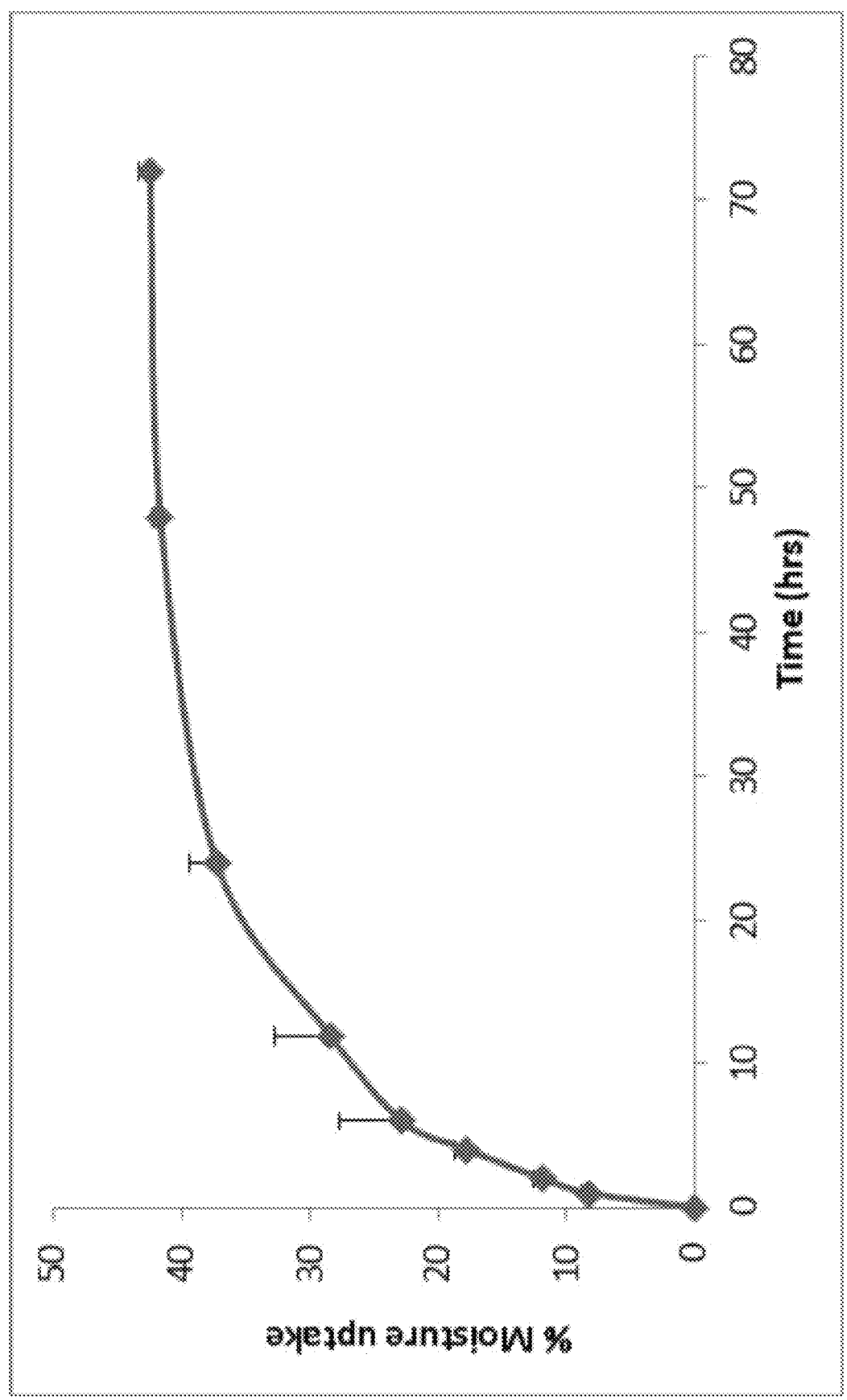
FIG. 2 shows moisture uptake of tetracycline formulation as a function of exposure time.

Moisture uptake studies were performed in presence of sodium bromide in a desiccator. As can be seen from FIG. 2, the moisture uptake increased with exposure time but reached saturation within 24 hrs. At the end of 48 hrs moisture uptake was 41.65±0.59%. The results show that the formulation tends to take up moisture and should be stored in an appropriate container to minimize the exposure to moisture.

Study #2—Skin Irritation Studies

In vitro skin irritation studies were carried out using reconstructed human skin (EPI-200; Epiderm; Mattek Corporation, Ashland, MA). The tissue (n=3) was exposed to the tetracycline solution, formulation, blank formulation and positive control (1% Triton X-100) for varying time periods (2-24 hours) and the viability of the cells was determined by MTT assay. Briefly, the MTT assay was performed by transferring the tissues to 24-well plates containing MTT medium (1 mg/ml). After 3 hours, formazan salt formed by cellular mitochondria was extracted with 2 ml/tissue of isopropanol and the optical density will be measured using a plate reader at 570 nm. Relative cell viability will be calculated as % of the mean of the negative control. The cytotoxicity was estimated by the time to kill 50% of the cells (ET-50).

In-vivo skin irritation studies of tetracycline formulation were carried out using 6 weeks old SKH-1 mice using a protocol approved by the Institutional Animal Care and Use Committee at the University. Mice were divided into five groups as shown in the Table 1 below. About 100 µl of the solution/formulations (equivalent to 3 mg of tetracycline) were applied over a 2 $cm_2$ area on the dorsal surface of the three times a day for 5 days. The formulation was gently rubbed on the skin surface for about 3-5 minutes on each animal consistent with topical application procedure in humans. In these studies saline was used as negative control and 1% w/v sodium lauryl sulfate solution (a known skin irritant) was used as the positive control. The transepidermal water loss (TEWL) is a measure of skin barrier changes was measured every day for 5 days using a TEWA meter (Delfin). At the end of $5_{th}$ day the animals were euthanized. Five treatment groups were involved:

TABLE 1

Treatment groups

| Group | Treatment |
|---|---|
| Group 1 | Tetracycline solution |
| Group 2 | Blank formulation |
| Group 3 | Tetracycline formulation |
| Group 4 | Negative control |
| Group 5 | Positive control |

Figure 3:
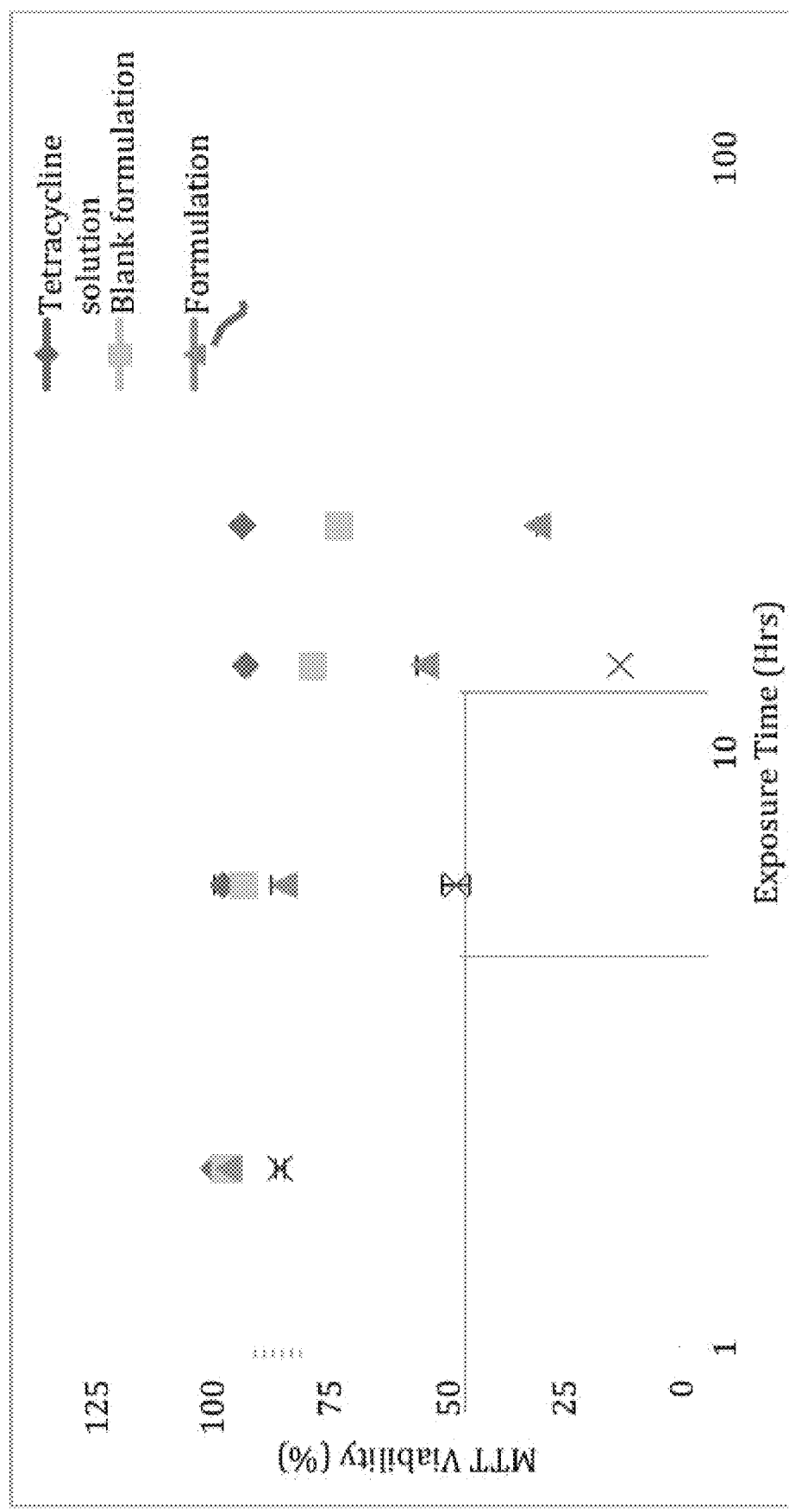
FIG. 3 shows MTT viability assay of reconstructed human skin after treatment with different formulations.

Results of the In-vitro skin irritation studies are indicated in FIG. 3 and Table 2. As can be seen from FIG. 3 and Table 2, both the tetracycline solution and the blank formulation were not irritating to the skin, while the tetracycline formulation showed very mild irritation. Based on the scoring scale from the manufacturer (Table 3), the irritation of tetracycline formulation is comparable to the irritation seen with baby shampoo.

TABLE 2

Results of skin irritation studies

| Treatment | ET 50 Value (Hrs) | Irritation reaction |
| --- | --- | --- |
| Tetracycline solution | 99.8 | Non irritating |
| Blank formulation | 33.854 | Non irritating |
| Formulation | 15.55 | Very mild |
| Positive control | 5.28 | Moderate to mild |

TABLE 3

ET-50 and irritation potential along with examples

| ET-50 (hrs) | Expected In vivo Irritancy | Example |
| --- | --- | --- |
| <0.5 | Strong/severe, possible corrosive conc. | Nitric acid |
| 0.5-4 | Moderate | 1% Sodium Dodecyl Sulfate |
| 4-12 | Moderate to mild | 1% Triton X-100 |
| 12-24 | Very mild | Baby shampoo |
| 24 | Non-irritating | 10% Tween 20 |

Figure 4:
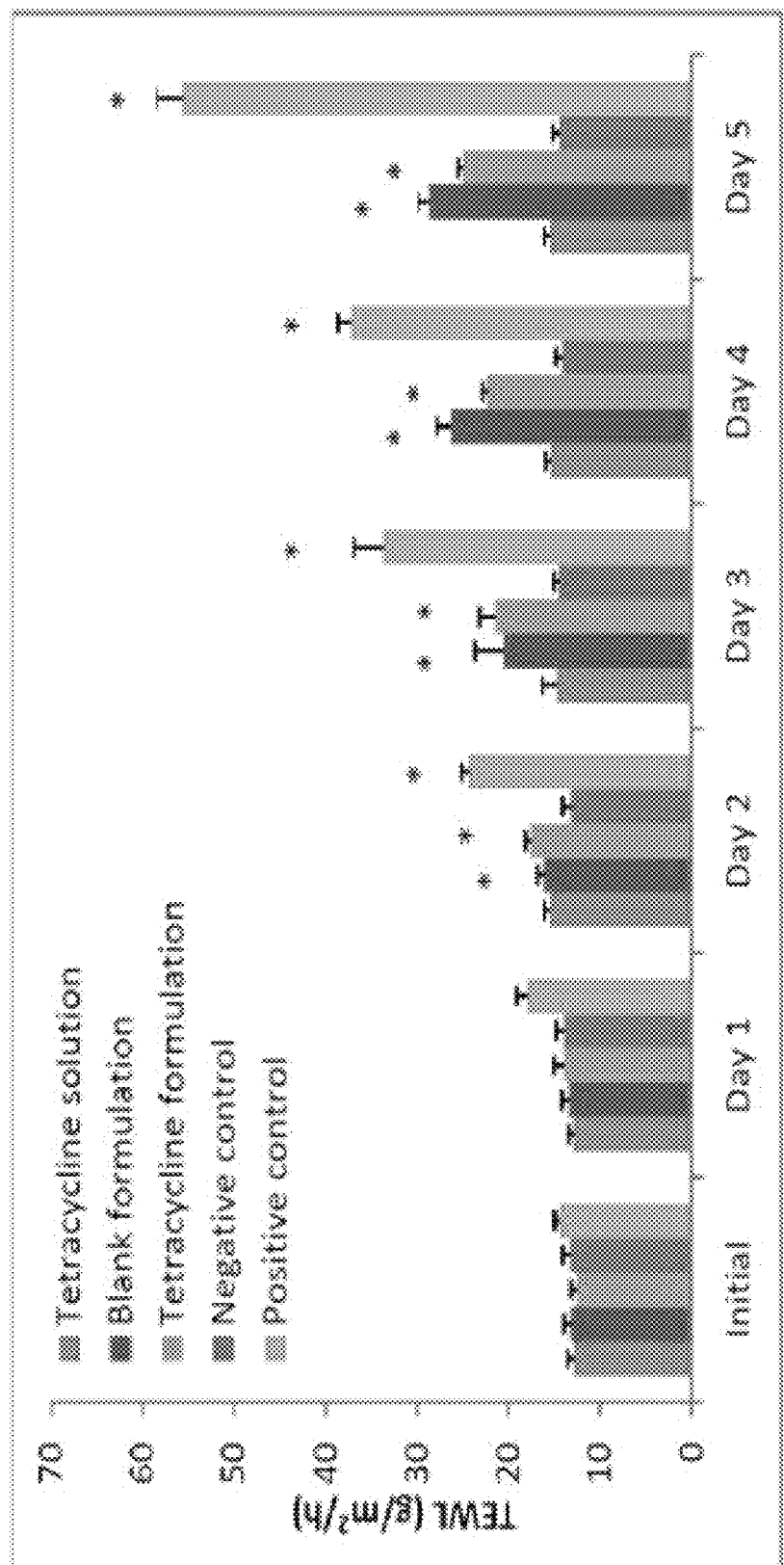
FIG. 4 shows TEWL values after different treatments. Values are mean±SD (n=3).

In-vivo skin irritation studies were performed with SKH-1 hairless mice model for 5 days. This animal model is widely used model for the topical irritation studies. No skin irritation was observed with tetracycline solution (FIG. 4). In case of the blank formulation skin irritation was observed starting from the 3rd day but was significantly lower than the positive control (FIG. 4). The results are in agreement with the in-vitro skin irritation studies and suggest that the tetracycline formulation may cause mild skin irritation on multiple applications.

Study 3: Skin Penetration Studies

Skin penetration studies were carried out using porcine full-thickness skin (Procured from Department of Animal and Range Sciences, SDSU) and excised human skin (NDRI, Philadelphia, PA). The skin was sandwiched between the two compartments of a vertical diffusion cell and equilibrated for 3 hrs. The receptor compartment was filled with phosphate buffer (pH 7.4) and was maintained at 37° C. with stirring. About 100 µl of the tetracycline solution and formulation (equivalent to 3 mg of tetracycline) was spiked with 3H tetracycline (0.4 µci) and applied to the donor compartment and treated for 6 or 48 hrs. Samples (200µ) were removed from the receptor compartment at predetermined intervals and replaced with an equal volume of fresh buffer. To study the effect of the formulation forming a skin depot, in a separate experiment the skin was treated for 6 hrs and the treatment was removed. The donor compartment was replaced with plain buffer (pH 7.4) and the study was continued for 48 hrs. At the end of the study the skin was taken out and stratum corneum (SC) was removed using tape stripping and the tape strips were soaked in 50% ethanol overnight to extract the drug. The remaining skin (epidermis and dermis) was homogenized using 1M sodium hydroxide solution. Scintillation cocktail was added to all the samples and the radioactive counts were measured in a scintillation counter (Beckman).

Figure 5:
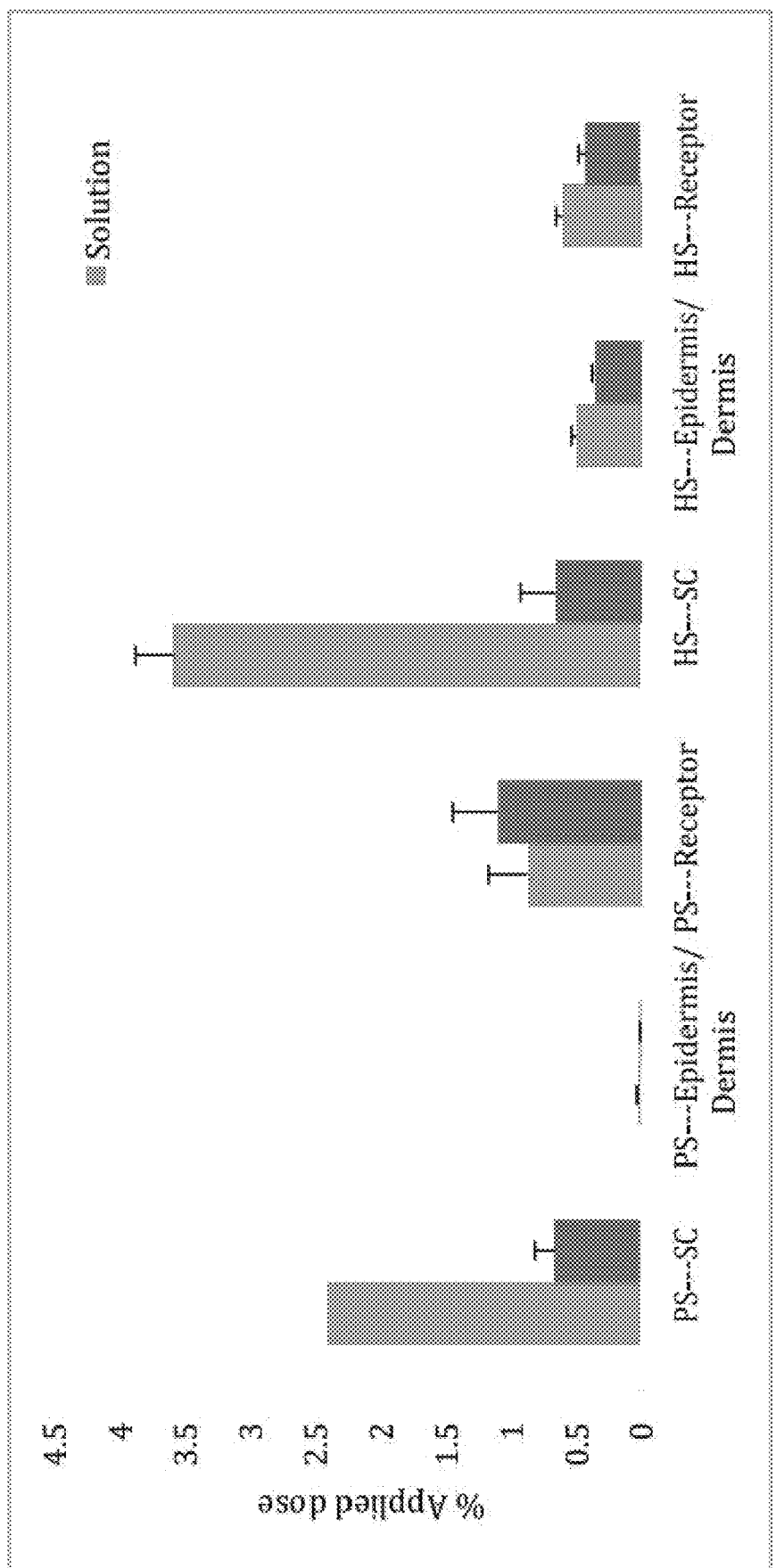
FIG. 5 shows Percent of applied dose of tetracycline in stratum corneum (SC), epidermis/dermis and receptor compartment after 6 hrs of treatment of porcine skin (PS) and human skin (HS).
Figure 6:
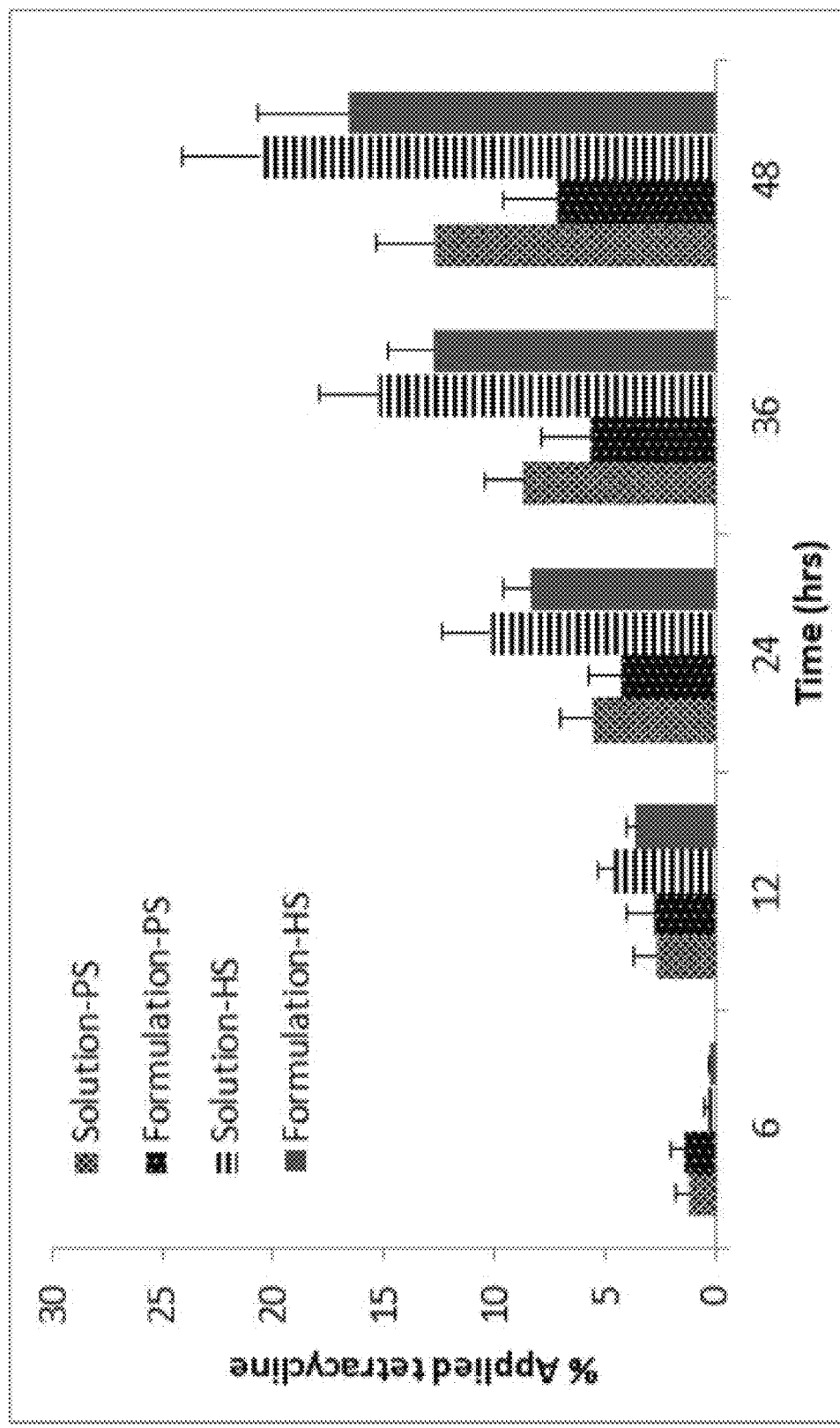
FIG. 6 shows percent of applied dose of tetracycline in receptor compartment after 48 hrs of treatment of porcine skin (PS) and human skin (HS).
Figure 7:
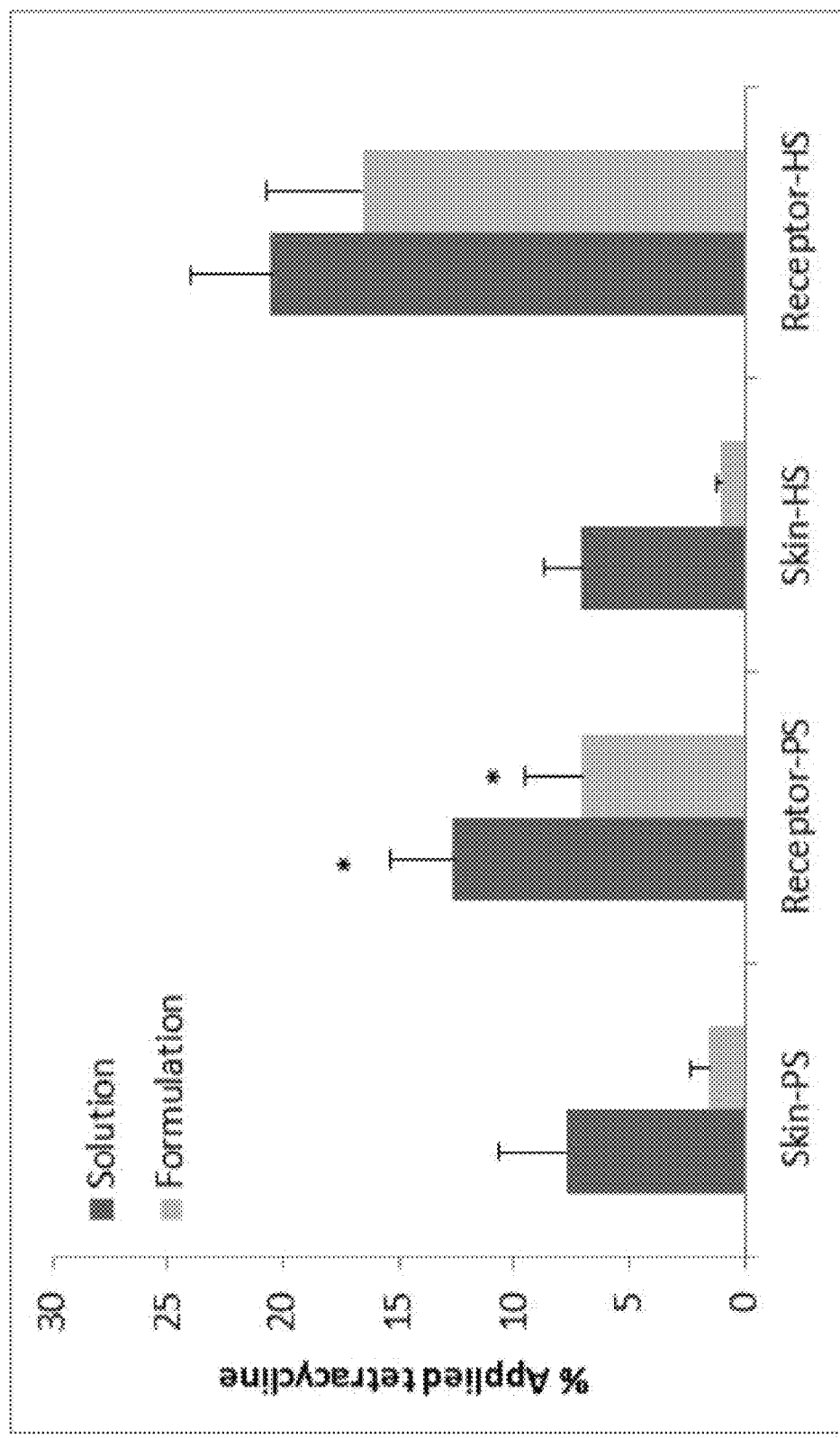
FIG. 7 shows percent of applied dose of tetracycline in skin and in receptor compartment after 48 hrs of treatment of porcine skin (PS) and human skin (HS).
Figure 8:
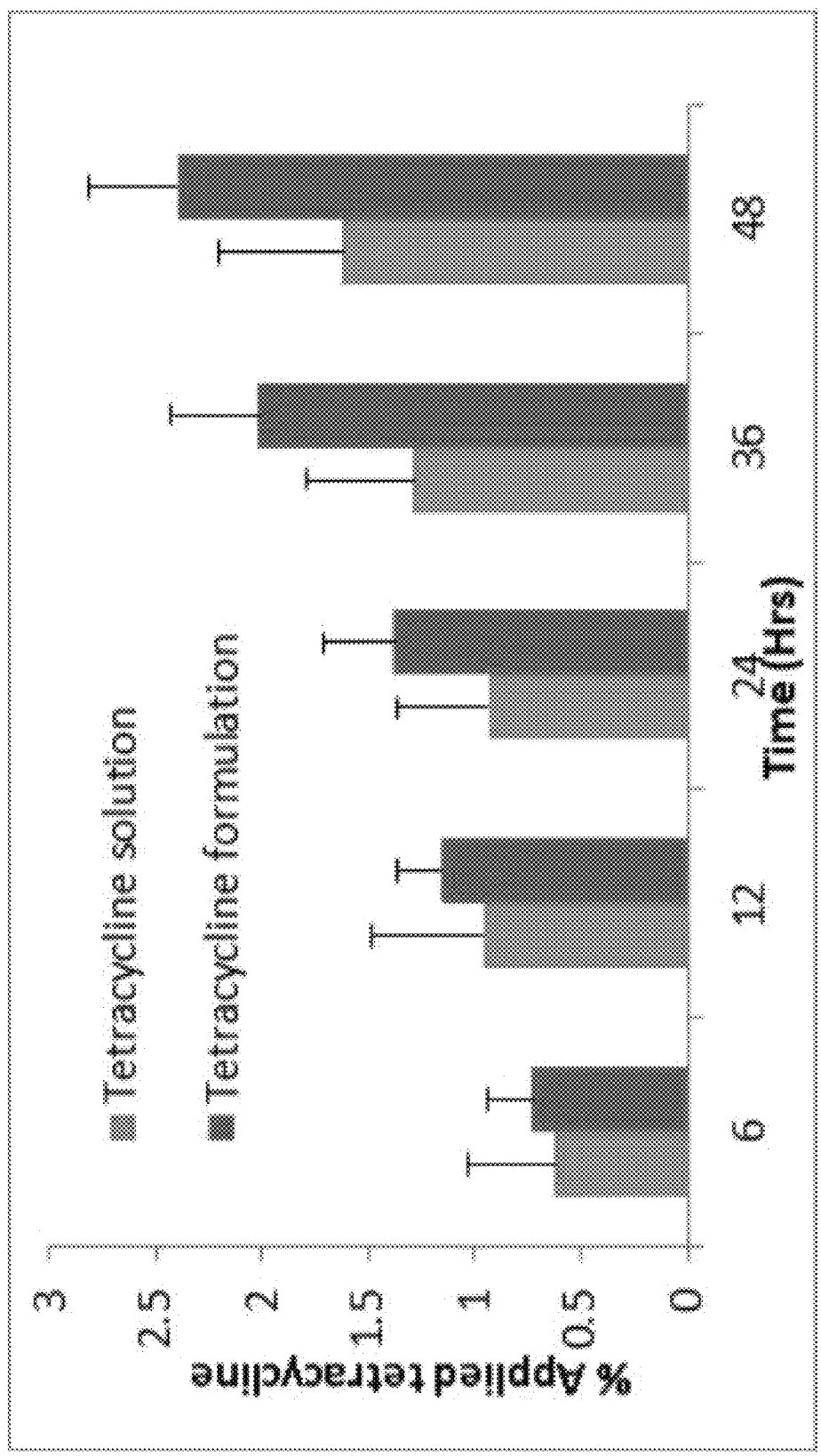
FIG. 8 shows Percent of applied dose of tetracycline in receptor compartment till 48 hrs after treatment of porcine skin for 6 hrs followed by removal of the drug.
Figure 9:
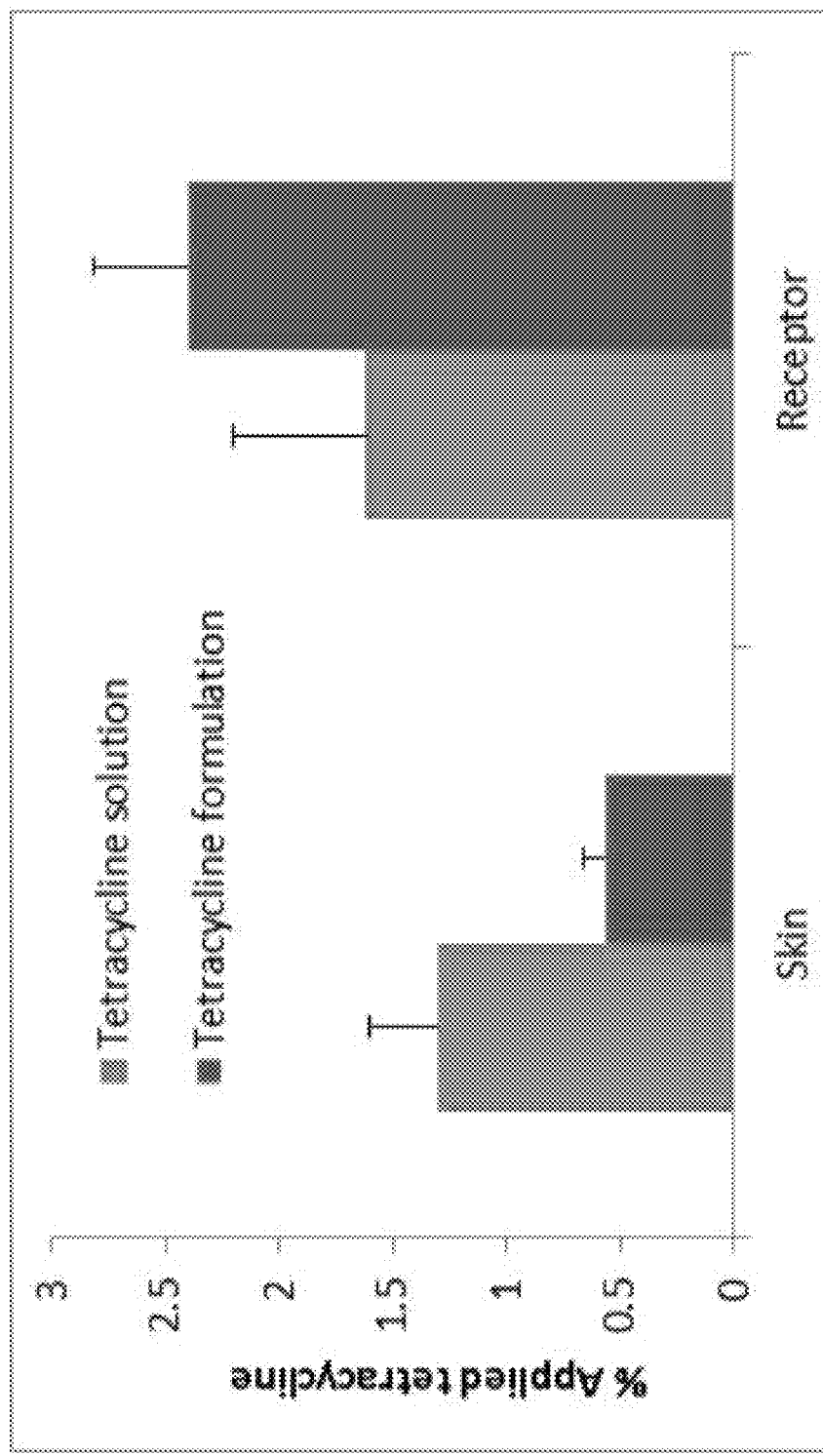
FIG. 9 shows percent of applied dose of tetracycline in skin and receptor compartment at 48 hrs after treatment of porcine skin for 6 hrs followed by removal of the drug.

In-vitro skin penetration studies were carried out with the full-thickness porcine skin and further validated with the full-thickness human skin. Around 0.5-2% of the applied dose was found in the skin with tetracycline formulation after 6 hrs of treatment (FIG. 5). The skin penetration increased with increase in treatment time (FIG. 6-7). Although the human skin showed slightly higher penetration than porcine skin the trend was similar (FIG. 5-7). The solution formulation penetrated more across the skin both in case of porcine and human skin compared to the proprietary tetracycline formulation but was not statistically significant (FIG. 5-7). As expected the skin penetration of tetracycline increased with increase in treatment time (FIG. 5-7). The formulation did not form a significant depot in the skin as seen from the skin disposition studies (FIGS. 8 and 9). Overall the results showed that the amount of tetracycline in the human skin (20-60 µg/sq·cm) was comparable to the therapeutic concentration required for antimicrobial activity (MIC is <100 µg/ml; Hada et al., J. Control. Rel. 108; 341-350, 2005).

Figure 10:
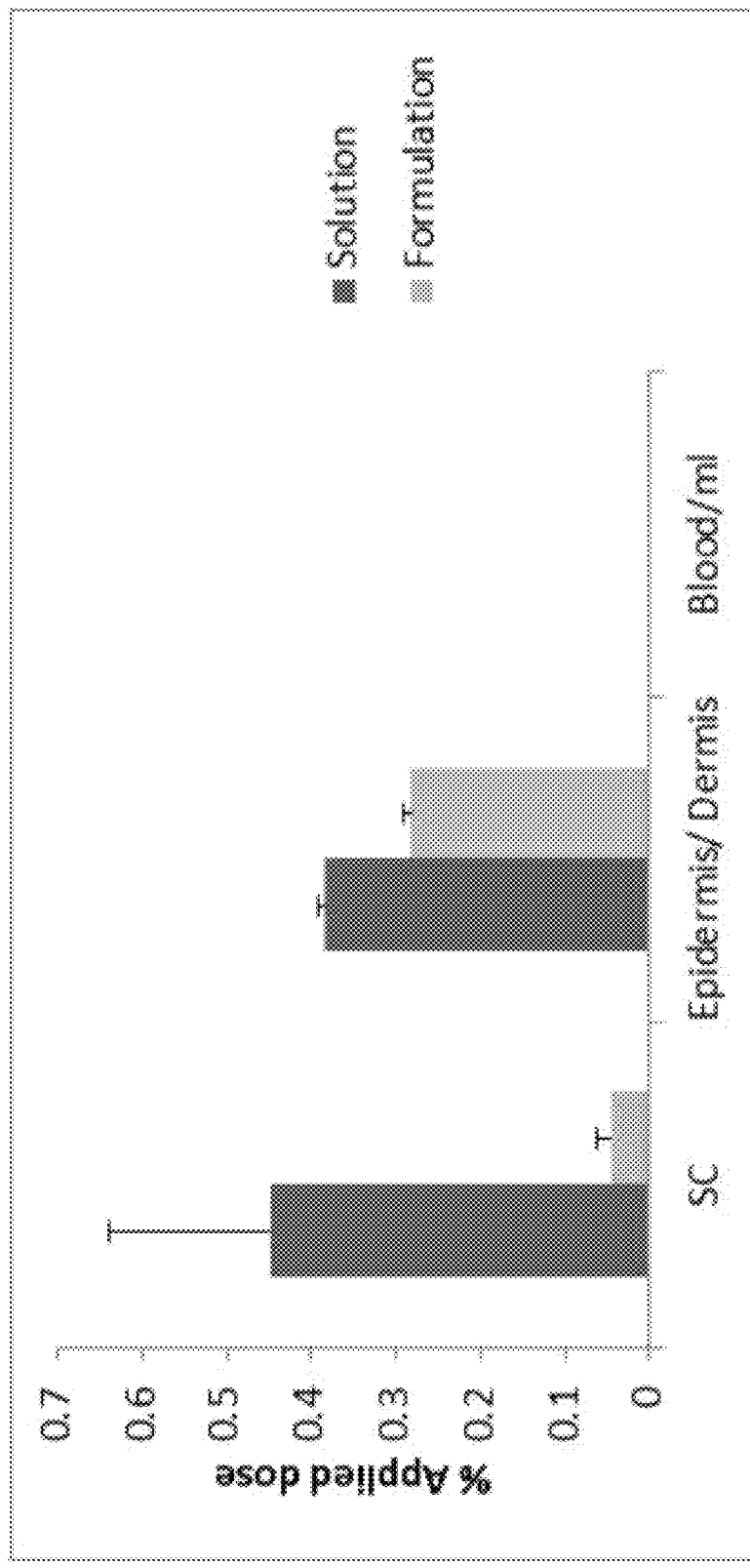
FIG. 10 shows percent of applied dose of tetracycline in skin and in blood after 6 hrs of treatment in vivo in mice.

Topical bioavailability studies were conducted in hairless mice using a protocol approved by the Institutional Animal Care and Use Committee. Hairless SKH-1 Mice was divided into 2 groups (n=4). One group was treated with tetracycline solution (100 µl equivalent to 3 mg of tetracycline) and other group was treated with tetracycline formulation (100 µl equivalent to 3 mg of tetracycline) for a period of 6 hrs over a surface area of 2 $cm_2$ under isoflurane anesthesia. Later the mice were sacrificed and stratum corneum was separated using adhesive tape strips. The remaining skin (epidermis/dermis) and blood was collected by cardiac puncture. The tetracycline amount was determined by radiochemical method of analysis. The in-vivo skin penetration studies were carried out in SKH-1 hairless mice. As can be seen from FIG. 10, tetracycline was mainly retained in the skin and there were no measurable drug levels in the blood after 6 hrs treatment with both the formulations. Consistent with the in-vitro skin penetration studies, the tetracycline skin penetration from the formulation was lower than the solution.

Study 4: Skin Penetration Studies Using a Simulated Wound Injury Model

To estimate skin penetration of tetracycline when applied to damaged skin, as in case of wound and skin injuries, skin penetration was studied by removing the stratum corneum (SC) by tape stripping. In this study, the stratum corneum (SC) was removed using a scotch tape and different degrees of skin barrier damage was simulated by removing 50% of SC and 100% of SC. The amount of SC removed was estimated by measuring the weight of scotch tape before and after the SC removed. Difference in weight of the scotch tape was used to estimate the amount of SC removed. The skin barrier changes were estimated by measuring trans-epidermal water loss (TEWL) using a TEWA meter (Delfin, Denmark). SC thickness was calculated based on density of the SC (1 g/$cm_3$). The SC weight was converted into grams (for 1 $cm_2$ area) and then converted into volume i.e. ml using density (using $cm_3$) and finally converted from centimeters into micrometers (1 cm=10000 micrometers) to get the SC thickness. After removal of 50% of 100% of stratum corneum, the porcine skin was mounted on the diffusion cell and the skin penetration studies were carried out for 48 hrs as explained earlier. The amount of drug in the receptor and in the skin was quantified using radiochemical method of analysis as discussed in above.

Figure 11:
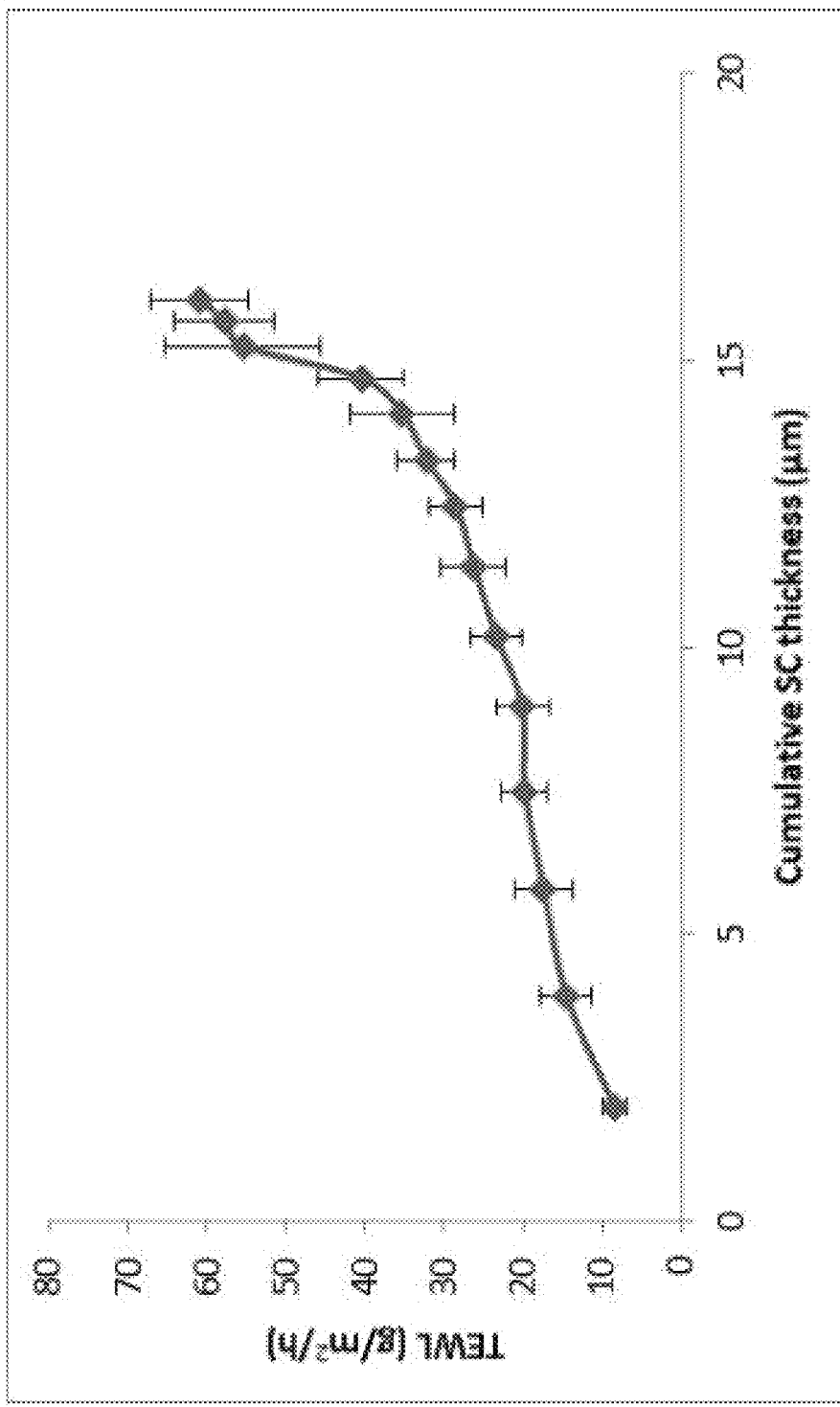
FIG. 11 shows TEWL as a function of SC removal after 100% removal of SC.
Figure 12:
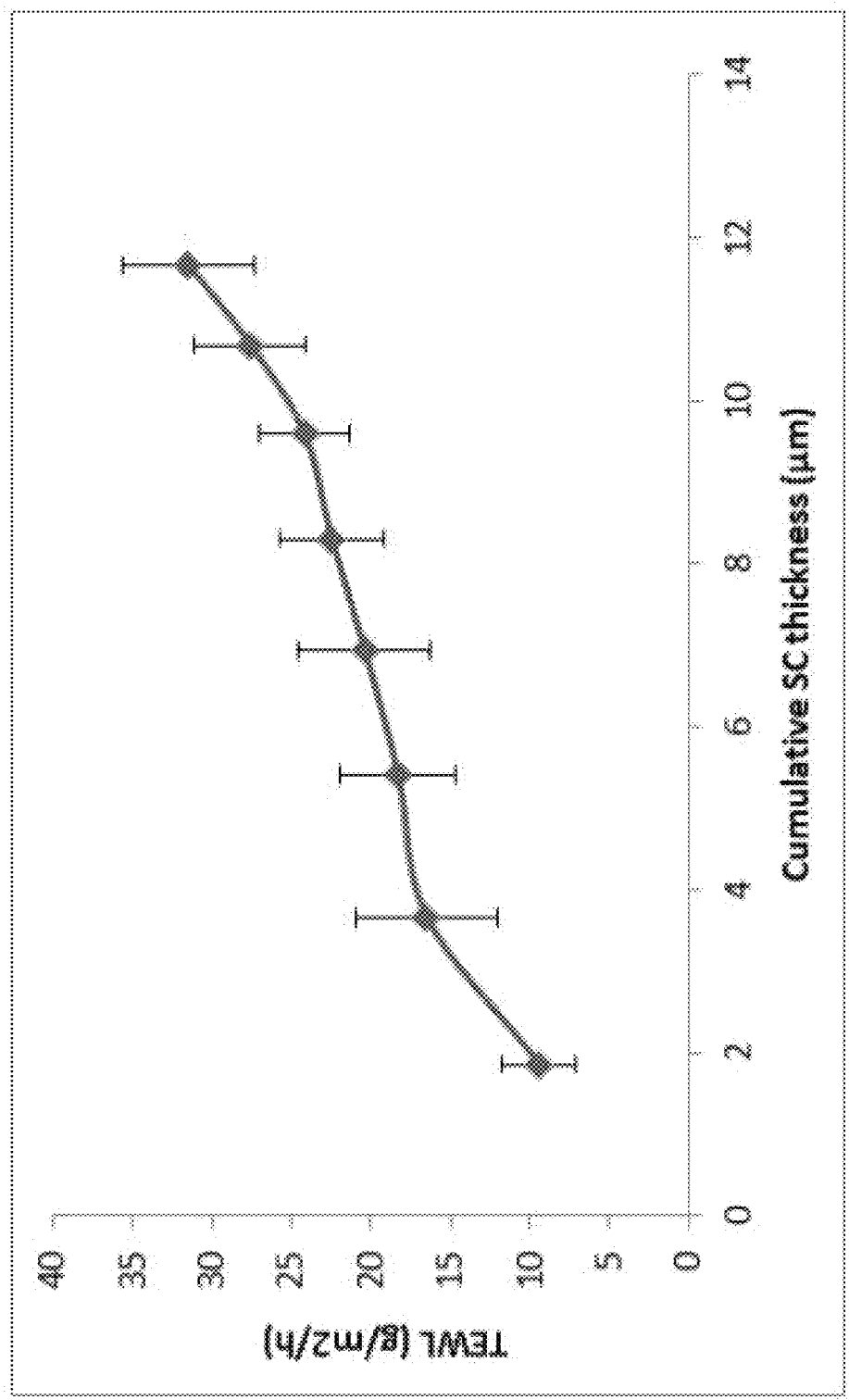
FIG. 12 shows TEWL as a function of SC removal after 50% removal of SC.
Figure 13:
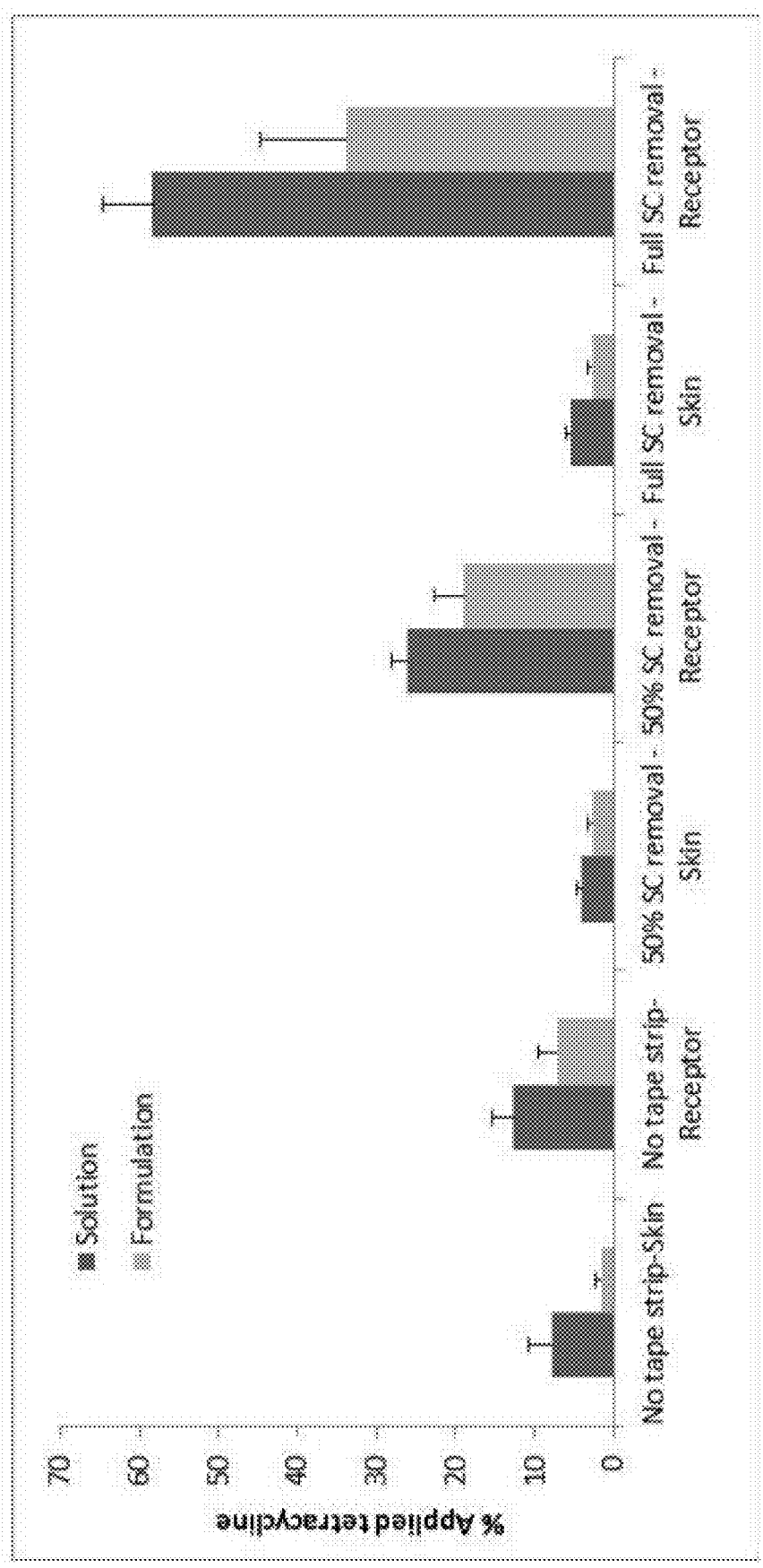
FIG. 13 shows in vitro skin penetration of tetracycline in intact and tape-stripped porcine skin.

To study the penetration of the tetracycline formulations in wound and skin injuries, in-vitro would injury model was created using the tape stripping technique. As can be seen from FIGS. 11 and 12, the TEWL increased with each tape strip and after 100% and 50% SC removal the TEWL value increased by 6 and 3 folds respectively. The SC thickness in porcine skin is 15-20 µm. Around 50% of the SC was considered to be removed based on half of the TEWL value observed with 100% SC removal (FIGS. 11 & 12). As can be seen from FIG. 13, after tape-stripping there was a significant increase in drug penetration across the skin compared to the intact skin. The results indicate that alteration in the skin barrier can lead to higher drug absorption through the skin. However the amount of skin penetration of tetracycline from the formulation was significantly less compared to a simple solution.

A study was conducted using a protocol approved by Institutional Animal Care and Use Committee in hairless SKH-1 mice. In this study, the stratum corneum (SC) was removed using a scotch tape and skin barrier damage was simulated by removing 100% of SC, as discussed in an earlier section. The amount of SC removed was estimated by measuring the difference in the tape-strip before and after tape-stripping and the SC thickness was calculated as described in the previous section. The skin barrier changes were estimated by measuring the trans-epidermal water loss (TEWL). After removal of 100% of stratum corneum, the skin penetration studies were carried out for 6 hrs. The amount of drug in the blood and in the skin was quantified using radiochemical method of analysis as discussed above.

Figure 14:
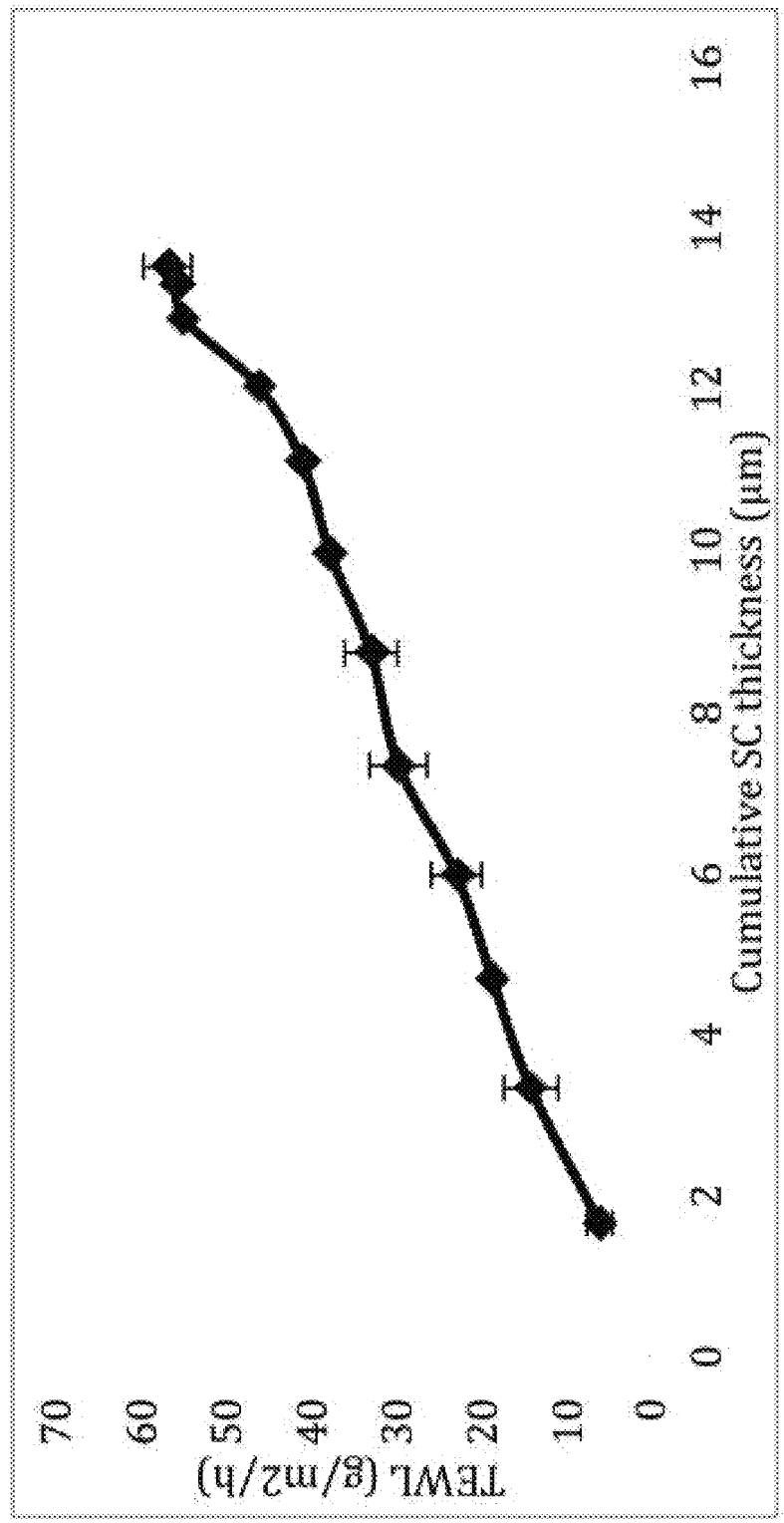
FIG. 14 shows TEWL as a function of SC removal after 100% removal of SC in vivo in mice.
Figure 15:
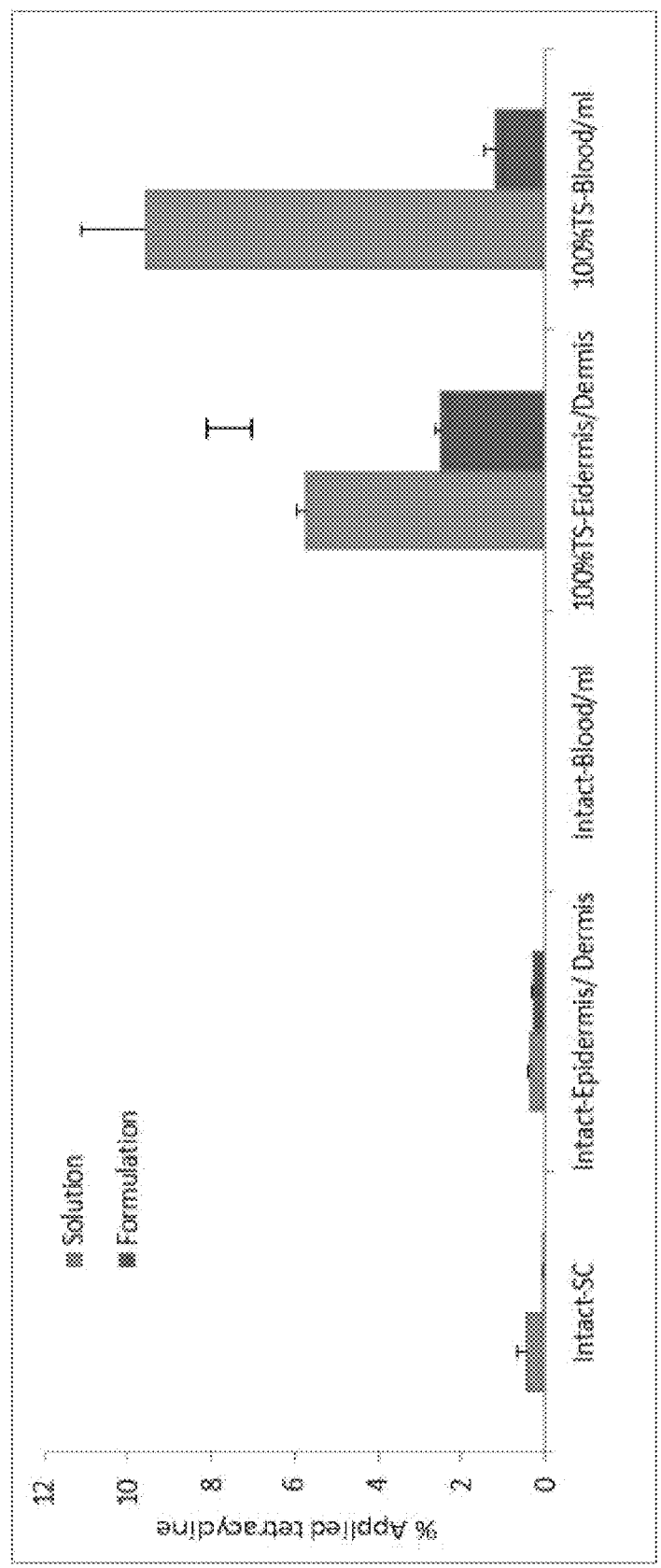
FIG. 15 shows in vivo skin penetration of tetracycline in intact and tape-stripped mouse skin.

In-vivo skin penetration studies were carried out in SKH-1 hairless mice after tape stripping the stratum corneum (100% skin damage). The removal of SC was confirmed from the significant increase in TEWL values (FIG. 14). As can be seen from FIG. 15, there was significant penetration of tetracycline in blood compared to intact skin. In case of intact skin there was no measurable tetracycline in the blood. Compared to the solution formulation, the proprietary formulation showed lesser drug penetration into blood consistent with the in-vitro studies.

Overall the results from this study show that the tetracycline formulation is generally safe for topical application and it can achieve therapeutic concentrations in the skin to treat skin infections. In damaged skin, such as wounds, the penetration of tetracycline would be higher than in an intact skin. Specific conclusions from each result section also indicate:

Study 1: The TCN formulation is released over twenty four hours.

Study 2: The formulation takes up moisture.

Study 2: The irritation of tetracycline formulation is comparable to the irritation seen with baby shampoo.

Wound Care

3% Tetracycline Hydrochloride Ointment, described in enabling detail above, has been shown to be useful for wound care. Wound healing is believed to result from stem cell healing. Wounds and ulcers have been seen in testing shown which heal with virtually no scar tissue. The tissue regeneration is shown to be new tissue. 3% Tetracycline Hydrochloride Ointment is the world's only FDA-registered OTC product that is being used successfully in off-label applications in which the conversion of normal adult cells can be converted to adult stem cells to achieve accelerated stem cell healing using only a topical application (no surgery; no pills).

Data in tests suggest 3% Tetracycline Hydrochloride Ointment can induce stem cell healing without any surgical procedure to remove necrotic tissue from the burn, and provide a pristine substrate (no biofilms or scab tissue). 3% Tetracycline Hydrochloride Ointment seems to provide a very rapid kind of accelerated healing. As confirmed by many other human tests, stem cell healing can produce a result with NO SCAR TISSUE and NO ADHESION tissue. For cosmetic reasons, 3% Tetracycline Hydrochloride Ointment may be helpful to dermatologists who want results with no scar tissue.

These results were documented by the attending physician, and reviewed by a second physician who served as the principle investigator for this research.

Results reported describe a topical-only treatment—no pills, no injections, no IV drug delivery. More data is needed to fully characterize 3% Tetracycline Hydrochloride Ointment and its use as a topical treatment for burns.

3% Tetracycline Hydrochloride Ointment has also in tests proven to be effective for treating diabetic foot ulcers. A diabetic foot ulcer is an open sore or wound that most commonly occurs on the bottom of the foot in approximately 15 percent of patients with diabetes. Of those who develop a foot ulcer, six percent will be hospitalized due to infection or other ulcer-related complication.

Diabetes is the leading cause of non traumatic lower extremity amputations in the United States, and approximately 14 to 24 percent of patients with diabetes who develop a foot ulcer have an amputation.

In treatment of foot ulcers, 3% Tetracycline Hydrochloride Ointment has been found to be more effective than standard care, including IV antibiotics. The effect was greatest in those with the most severe wounds, i.e., large wounds that affect deeper anatomical structures. These patients were last resort patients that had failed all previous care and were headed to an amputation. In some cases even an amputation wasn't feasible because of the patient's cardiac status.

In tests it was concluded that 3% Tetracycline Hydrochloride Ointment is more than 96% effective in healing diabetic foot ulcers within 4 weeks. This effect is more pronounced in more severe wound, and the effect is the same whether the wound is infected or not.

Burn Treatment

3% Tetracycline Hydrochloride Ointment has been shown to be effective for treatment of burns. For example, a normal (without 3% Tetracycline Hydrochloride Ointment) recovery for a 2nd degree burn would typically take 5 to 10 times as long as it takes with treatment by 3% Tetracycline Hydrochloride Ointment. This accelerated healing evidence is not completely understood, but the probable reasons for this are believed to include (1) the action of the active ingredient, tetracycline, to fight ALL the bacteria in the region of application. The human body harbors thousands of bacteria types under normal conditions, most of which are harmless under normal conditions, but may become weak pathogens in injured tissue; and (2) the dual carrier action of 3% Tetracycline Hydrochloride Ointment to quickly take the active ingredient deep into the injury. The characteristics of a dual carrier drug-delivery system have been documented.

The human body has 10 times more microbes than cells, or an estimated 1,000 trillion bacteria for each one of us. A square centimeter of skin can have up to a million bacteria. The vast majority of these microbes are benign, helping digest food in our gut and crowding out their disease-causing brethren. But some of these bacteria develop parasitical strategies that make us sick.

According to the Howard Hughes Medical Institute (HHMI) of Maryland, we each house two to five pounds (1.0 to 2.26 kilograms) of live bacteria inside our bodies. Bacteria come in good and bad varieties, or more to the point, can be helpful or harmful. While the vast amount of attention is given to bad bacteria because of their potential for creating illness, humans share a necessary symbiotic relationship with many types of helpful bacteria. Some are crucial to our very survival. HHMI reports that the relationship between the different strains of bacteria and the human body is a dynamic one, constantly adjusting to changing conditions healthy human epidermis is colonized by roughly 1,000 species of bacteria. From the above referenced information, three important points have been established:
1. Most burns involve the skin.
2. The human body has 10 times more microbes than cells. A square centimeter of skin can have up to a million bacteria. A healthy human epidermis is colonized by roughly 1,000 species of bacteria.
3. The relationship between the different strains of bacteria and the human body is a dynamic one, constantly adjusting to changing conditions.

The changing conditions are dramatic when the skin is traumatized during a burn. This is particularly true for 2nd degree burns in which the formation of blisters change the physical characteristics of the burn area. Two changes are dominant—the localized accumulation of body fluid (in the blister), and a localized increase in temperature. Both of these changes are exactly the conditions (warm, wet environment) that many bacteria need to prosper and multiply. The low oxygen concentration in the blister is presumed because the fluid is not flowing blood, and blood is the fluid that supplies life-sustaining and healing oxygen to tissues in the body.

3% Tetracycline Hydrochloride Ointment appears to shorten the healing time of burn blisters because 3% Tetracycline Hydrochloride Ointment contains an ingredient that has been used by surgeons to promote live-sustaining and healing blood to tissue recovering from surgical trauma. This has been used in plastic surgery where accelerated healing is extremely important for the purpose of decreasing scar formation. 3% Tetracycline Hydrochloride Ointment contains Tetracycline-ABC which is believed to be the world's strongest broad-spectrum topical antibiotic. An obvious advantage results from using a broad-spectrum antibiotic on skin that is colonized by roughly 1,000 species of bacteria.

Additional supporting case-study data includes 3rd degree burns. These data also show that 3% Tetracycline Hydrochloride Ointment appears to dramatically shorten the healing time of burn blisters.

In conclusion, relative to treatment of burns, relief of intense pain and estimated 10× reduction in recovery time (12 hours) compared to typical recovery time (4 to 6 days) resulted from 3% Tetracycline Hydrochloride Ointment™ ointment use on the 2nd degree burn, as documented by a physician.

Treatment of Eczema

Stress is a part of life that is unavoidable, no matter what age you are. There is good stress, which motivates you while there is also bad stress that stresses you out and can give rise to a host of health problems. For those suffering with eczema, too much stress can signal a flare-up or even many flare-ups in a row if the stress is long term. Stress is defined as, "A mentally or emotionally disruptive or upsetting condition occurring in response to adverse external influences and capable of affecting physical health.

In one case study lesions were recurring, quite highly correlated to a level of productivity. The condition recurred in a cycle related to work activity in a high-stress lifestyle. The condition started about two years before 3% Tetracycline Hydrochloride Ointment treatment was tried. The lesions appeared sporadically on the hands, feet and armpits. It was noticed to peel.

It itching routinely after heavy meals. Some pain when pressure applied. Heat sensitive. Puss leaks out after a while in some cases. The lesions varied in size, quite predictably along with stress level.

Reduction in inflammation (redness), and the signs of healing were obvious only two days after 3% Tetracycline Hydrochloride Ointment ingredients treatment was begun. After two weeks the condition was cured.

Treatment of Psoriasis

Psoriasis is a chronic, autoimmune disease that appears on the skin. It occurs when the immune system sends out faulty signals that speed up the growth cycle of skin cells. Psoriasis is not contagious. It commonly causes red, scaly patches to appear on the skin. The scaly patches caused by psoriasis, called psoriatic plaques, are areas of inflammation and excessive skin production. Skin rapidly accumulates at these sites and is a silvery white appearance. Plaques frequently occur on the skin of the elbows and knees, but can affect any area including the scalp, palms of hands and soles of feet, and genitals. In contrast to eczema, psoriasis is more likely to be found on the extensor aspect of the joint. The disorder is a chronic recurring condition.

In one case study the patient said he had this condition for "perhaps 10 to 12 years." The cause of psoriasis is not exact. There are many treatments available, but because of its chronic recurrent nature psoriasis is a challenge to treat.

The patient's flare-ups of psoriasis had been treated with hydrocortizone creams, Neosporin and various other lotions, but with only limited success and only partial results. In a second occurrence 3% Tetracycline Hydrochloride Ointment was used and cleared up the visible symptoms in two days.

Treatment of MRSA

Methicillin-resistant *Staphylococcus aureus* (MRSA) is a bacterium that causes infections in different parts of the body. It's tougher to treat than most strains of *Staphylococcus aureus*—or staph—because it's resistant to some commonly used antibiotics. The symptoms of MRSA depend on where you're infected.

For MRSA and staph bacteria, 3% TETRACYCLINE HYDROCHLORIDE OINTMENT kills the bacteria over an area which is 22 to 23 times larger than the area where the 3% TETRACYCLINE HYDROCHLORIDE OINTMENT is applied. This AMPLIFIED BIO-LOGICAL COVERAGE is desired because this special formulation carries the tetracycline deep into the skin when it is rubbed on the surface.

In one clinical study the patient has been treated for several months before starting with 3% Tetracycline Hydrochloride Ointment. After seven days with 3% Tetracycline Hydrochloride Ointment topical treatment the condition was noticeably improved, and cured in 21 days.

Oleic Acid and Natural Oils

A very important functionality of topical treatment formulations in embodiments of the invention is ability to increase penetration of a patient's skin and tissue quickly and efficiently, to enhance delivery of curative agents in a formulation, such as 3% Tetracycline Hydrochloride Ointment.

Natural oils are commonly used in topical pharmaceutical formulations as emulsifiers, stabilizers or solubility enhancers. They are presented as safe and inert components, mainly used for formulation purposes. It is confirmed that natural oils can affect the skin penetration of various substances. Fatty acids are mainly responsible for this effect. Current understanding lacks reliable scientific data on penetration of natural oils into the skin and their skin penetration enhancement potential. In the current study, fatty acid content analysis was used to determine the principal fatty acids in soybean, olive, avocado, sea-buckthorn pulp, raspberry seed and coconut oils. Time of flight secondary ion mass spectrometry bio-imaging was used to determine the distribution of these fatty acids in human skin ex vivo after application of the oils. Skin penetration enhancement ratios were determined for a perspective antioxidant compound dihydroquercetin. The results demonstrated skin penetration of fatty acids from all oils tested. Only soybean and olive oils significantly increased the skin distribution of dihydroquercetin and can be used as skin penetration enhancers. However, no correlation can be determined between the fatty acids' composition and skin penetration enhancement using currently available methodological approaches. This indicates that potential chemical penetration enhancement should be evaluated during formulation of topically applied products containing natural oils.

In one study a purpose was to evaluate skin penetration of natural oils and their potential application as skin penetration enhancers for DHQ delivery. This is the first experimental study demonstrating penetration of Fatty Acids (FAs) from natural oils into human skin ex vivo. It was determined that the application of olive, avocado, soybean, sea-buckthorn pulp, coconut and soybean oils increases the content of FAs in the ex vivo skin layers. Moreover, soybean and olive oils were determined to be effective skin penetration enhancers for DHQ delivery.

Occurrence of topical fungal infections may be increasing. Cutaneous fungal infections like cutaneous candidiasis are more prominent in patients associated with AIDS. Current available strategies for the treatment of cutaneous fungal infections are creams or gels which show various adverse effects on skin along with systemic absorption. These drawbacks can be overcome by using various novel drug delivery systems.

An investigation exploring the potential of fatty acid vesicles (ufasomes) for topical delivery of clotrimazole was undertaken Oleic acid was employed as a fatty material for the preparation of vesicles. Clotrimazole-loaded oleic acid vesicles were prepared using a thin film hydration method. Prepared vesicles were characterized for size, size distribution, shape, thermal behavior (differential scanning calorimetry), in vitro release, in vitro antifungal activity, in vitro skin permeation and retention studies and for in vivo antifungal activity.

Transmission electron microscopic (TEM) images confirmed the formation of vesicular dispersion (ufasomes) of clotrimazole. Oleic acid vesicles possessed high drug entrapment (49.5 1.0%) and optimum size (455 22 nm) along with good colloidal characteristics. In vitro drug release study showed sustained release of drug from the vesicular dispersion. Skin permeation and skin retention studies suggested accumulation of drug in the epidermal part of the skin. In vivo study confirmed prolonged release of drug from oleic acid vesicle up to five days indicating its usefulness for long-term therapy. So, it can be concluded from the present study that fatty acid vesicle may be a good approach to treat topical fungal infections.

The skilled artisan will understand that the simple goal in embodiments of this invention is delivery of active antibiotic agents deep into human tissue through human skin, as a means of destroying bacterial infection in an alternative to orally ingested antibiotics. It has been determined by the present inventors that such topical treatment in many cases is far more effective than ingesting antibiotics, that must be digested and delivered to infected areas by blood circulation. Such circulation delivery is inefficient because the delivery is spread over all areas, not just focused to the actual infection, but the topical approach focuses delivery to exactly the region where it is required.

The implementation of the invention in various embodiments, however, is not so simple. There are a very wide variety of ingredients that may be used to enhance penetration and delivery. Many are described above, and the skilled person will understand that various embodiments of the invention may use any single ones or combinations of ingredients described in a wide variety of concentrations, The descriptions herein are therefore intended as exemplary, and not limiting. The scope of the invention is limited only by the claims.

The invention claimed is:

1. An antibiotic ointment for wound care comprising:

3% tetracycline HCl as an active antibiotic agent;

15% dimethyl sulfoxide operating as a tissue penetrating solvent;

oleic acid as a tissue penetrating agent;

85% dipropylene glycol as a tissue penetrating diluent; and a stabilizer comprising 1% ascorbic acid for maintaining the ointment, which also functions as a stabilizer for maintaining chemical stability and resistance to degradation;

wherein the oleic acid is combined with the dimethyl sulfoxide and the tetracycline HCl, thereby releasing, over time, the dimethyl sulfoxide which operates to further penetrate the tissue and delivering the tetracycline HCl to the wound.

2. The antibiotic ointment of claim 1 additionally comprising a Vitamin D source.

3. The antibiotic ointment of claim 2 wherein the vitamin D source is selected from the group consisting of cholecalciferol, 7-dehydrocholesterol, 25-hydroxycholecalciferol, and 1,25-dihydroxycholecalciferol in a medically efficacious amount.

* * * * *